United States Patent
Kusaka

(10) Patent No.: US 8,094,232 B2
(45) Date of Patent: Jan. 10, 2012

(54) IMAGING APPARATUS

(75) Inventor: Yosuke Kusaka, Yokohama (JP)

(73) Assignee: Nikon Corporation, Tokyo (JP)

( * ) Notice: Subject to any disclaimer, the term of this patent is extended or adjusted under 35 U.S.C. 154(b) by 649 days.

(21) Appl. No.: 12/292,006

(22) Filed: Nov. 10, 2008

(65) Prior Publication Data

US 2009/0128671 A1 May 21, 2009

Related U.S. Application Data

(60) Provisional application No. 60/996,474, filed on Nov. 19, 2007.

(30) Foreign Application Priority Data

Nov. 16, 2007 (JP) ................................. 2007-298249

(51) Int. Cl.
*G03B 13/28* (2006.01)
*H04N 9/07* (2006.01)

(52) U.S. Cl. ...................................................... 348/349

(58) Field of Classification Search .................. 348/345, 348/349
See application file for complete search history.

(56) References Cited

U.S. PATENT DOCUMENTS

| | | | |
|---|---|---|---|
| 6,750,437 B2 * | 6/2004 | Yamashita et al. ......... | 250/208.1 |
| 6,781,632 B1 * | 8/2004 | Ide ............................... | 348/345 |
| 6,819,360 B1 * | 11/2004 | Ide et al. ........................ | 348/340 |
| 6,829,008 B1 * | 12/2004 | Kondo et al. .................. | 348/302 |
| 7,800,666 B2 * | 9/2010 | Kim et al. ...................... | 348/273 |
| 2008/0080028 A1 * | 4/2008 | Bakin et al. .................... | 358/514 |

FOREIGN PATENT DOCUMENTS

| JP | A-01-216306 | 8/1989 |
|---|---|---|
| JP | 2003244712 A * | 8/2003 |

* cited by examiner

*Primary Examiner* — Clayton E Laballe
*Assistant Examiner* — L. W. R.
(74) *Attorney, Agent, or Firm* — Oliff & Berridge, PLC

(57) ABSTRACT

An imaging apparatus includes: an image sensor with imaging pixels and focus detection pixels arrayed on a plane, which captures an image via an optical system; and a correction unit that corrects image data output from an imaging pixel based upon output data from a focus detection pixel present near the imaging pixel.

36 Claims, 22 Drawing Sheets

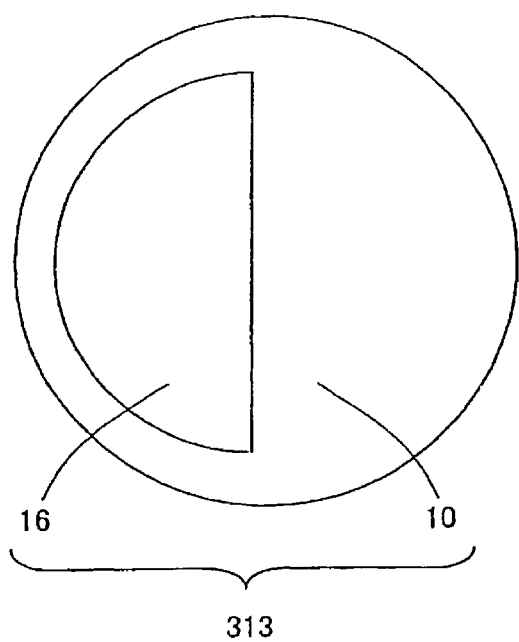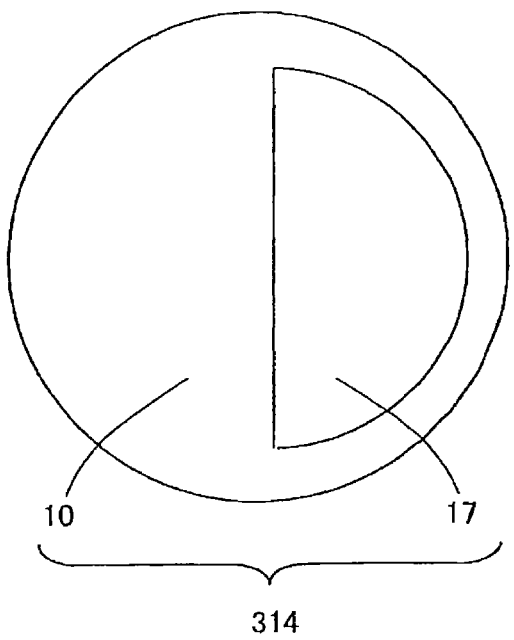

IMAGING APPARATUS

This non-provisional application claims the benefit of U.S. Provisional Application No. 60/996,474 filed Nov. 19, 2007. This application also claims priority from Japanese Application No. 2007-298249 filed Nov. 16, 2007. The disclosure of each of the earlier applications is incorporated herein by reference in its entirety.

BACKGROUND OF THE INVENTION

1. Field of the Invention

The present invention relates to an imaging apparatus.

2. Description of Related Art

There is an imaging apparatus known in the related art that includes an image sensor with focus detection pixels adopting a split pupil phase detection method, arrayed among imaging pixels in the image sensor, thereby fulfilling both an imaging function and a focus detection function (see Japanese Laid Open Patent Publication No. H01-216306).

When obtaining image data via the image sensor in this imaging apparatus, image data at pixel positions occupied by the focus detection pixels are generated through interpolation based upon the image data from imaging pixels present near the focus detection pixels.

SUMMARY OF THE INVENTION

There is an issue yet to be addressed in the imaging apparatus in the related art described above in that when the image data are generated through the pixel interpolation processing, the quality of the image in the vicinity of the focus detection pixels tends to degrade.

According to the 1st aspect of the present invention, an imaging apparatus comprises: an image sensor with imaging pixels and focus detection pixels arrayed on a plane, which captures an image via an optical system; and a correction unit that corrects image data output from an imaging pixel based upon output data from a focus detection pixel present near the imaging pixel.

According to the 2nd aspect of the present invention, in the imaging apparatus according to the 1st aspect it is preferred that the focus detection pixel is structurally different from the imaging pixel.

According to the 3rd aspect of the present invention, in the imaging apparatus according to the 2nd aspect it is preferred that a photoelectric conversion unit at the focus detection pixel assumes an areal size different from a photoelectric conversion unit at the imaging pixel.

According to the 4th aspect of the present invention, in the imaging apparatus according to the 2nd aspect it is preferred that a photoelectric conversion unit at the focus detection pixel assumes a shape different from a photoelectric conversion unit at the imaging pixel.

According to the 5th aspect of the present invention, in the imaging apparatus according to the 2nd aspect it is preferred that a photoelectric conversion unit at the focus detection pixel assumes a position different from a photoelectric conversion unit at the imaging pixel.

According to the 6th aspect of the present invention, in the imaging apparatus according to the 2nd aspect it is preferred that: the imaging pixel and the focus detection pixel each include a condenser unit via which light is condensed onto the photoelectric conversion unit thereof; and the condenser unit at the focus detection pixel is structurally different from the condenser unit at the imaging pixel.

According to the 7th aspect of the present invention, in the imaging apparatus according to the 1st aspect it is preferred that the focus detection pixel has spectral sensitivity characteristics different from spectral sensitivity characteristics of the imaging pixel.

According to the 8th aspect of the present invention, in the imaging apparatus according to the 1st aspect it is preferred that the correction unit adjusts a correction extent in correspondence to an areal size of a photoelectric conversion unit at the focus detection pixel.

According to the 9th aspect of the present invention, in the imaging apparatus according to the 1st aspect it is preferred that the correction unit adjusts a correction extent in correspondence to an aperture opening F number of the optical system.

According to the 10th aspect of the present invention, in the imaging apparatus according to the 1st aspect it is preferred that the correction unit adjusts a correction extent in correspondence to a position of the imaging pixel on an imaging plane formed via the optical system.

According to the 11th aspect of the present invention, in the imaging apparatus according to the 1st aspect it is preferred that the correction unit adjusts a correction extent in correspondence to a distance between a photoelectric conversion unit at the focus detection pixel and a photoelectric conversion unit at the imaging pixel.

According to the 12th aspect of the present invention, in the imaging apparatus according to the 1st aspect it is preferred that: the imaging pixels include a plurality of types of imaging pixels with varying spectral sensitivity characteristics; and the correction unit adjusts a correction extent in correspondence to the spectral sensitivity characteristics of the imaging pixels.

According to the 13th aspect of the present invention, in the imaging apparatus according to the 1st aspect it is preferred that the imaging apparatus further comprises an interpolation unit that generates image data at a position occupied by the focus detection pixel through interpolation executed based upon image data at imaging pixels having been corrected by the correction unit.

According to the 14th aspect of the present invention, in the imaging apparatus according to the 1st aspect it is preferred that: the focus detection pixel includes a photoelectric conversion unit that generates a pair of image signals in correspondence to a pair of images formed with a pair of light fluxes passing through the optical system; and the imaging apparatus further comprises a focus detection unit that detects a focusing condition of the optical system by determining a shift quantity, indicating an extent of relative offset between the pair of images, based upon the pair of image signals.

According to the 15th aspect of the present invention, in the imaging apparatus according to the 14th aspect it is preferred that the focus detection pixel includes one micro lens and a pair of photoelectric conversion units.

According to the 16th aspect of the present invention, in the imaging apparatus according to the 14th aspect it is preferred that the focus detection pixels include first focus detection pixels each equipped with one micro lens and a photoelectric conversion unit that receives one of the light fluxes making up the pair of light fluxes and second focus detection pixels each equipped with one micro lens and a photoelectric conversion unit that receives another light flux making up the pair of light fluxes.

According to the 17th aspect of the present invention, in the imaging apparatus according to the 1st aspect it is preferred that the correction unit corrects the image data output from the imaging pixel based upon the output data from the focus detection pixel present near the imaging pixel and a difference between an effect of crosstalk occurring when an imaging pixel is present near the imaging pixel and an effect of crosstalk occurring when a focus detection pixel is present near the imaging pixel.

According to the 18th aspect of the present invention, in the imaging apparatus according to the 1st aspect it is preferred that the correction unit uniformly executes crosstalk correction for image data output from the imaging pixels by hypothetically assuming that all pixels are imaging pixels, and then corrects the image data from an imaging pixel near the focus detection pixel among the image data having undergone uniform crosstalk correction, based upon data output from the focus detection pixel present near the imaging pixel and a difference between an effect of crosstalk occurring when an imaging pixel is present near the imaging pixel and an effect of crosstalk occurring when a focus detection pixel is present near the imaging pixel.

According to the 19th aspect of the present invention, in the imaging apparatus according to the 17th aspect it is preferred that the correction unit determines a correction value by multiplying the output data from the focus detection pixel present near the imaging pixel by a coefficient obtained based upon a difference between an effect of crosstalk occurring when an imaging pixel is present near the imaging pixel and an effect of crosstalk occurring when a focus detection pixel is present near the imaging pixel and corrects the image data output from the imaging pixel based upon the correction value.

According to the 20th aspect of the present invention, an imaging apparatus comprises: an image sensor with imaging pixels and focus detection pixels arrayed on a plane, which captures an image via an optical system; a correction unit that corrects image data output from an imaging pixel based upon output data from a pixel present near the imaging pixel; and an interpolation unit that generates image data at positions occupied by the focus detection pixels through interpolation executed based upon image data at the imaging pixels having been corrected by the correction unit.

BRIEF DESCRIPTION OF THE DRAWINGS

FIGS. 19A and 19B show the structures of focus detection pixels in a variation.

DESCRIPTION OF PREFERRED EMBODIMENTS

Figure 1:
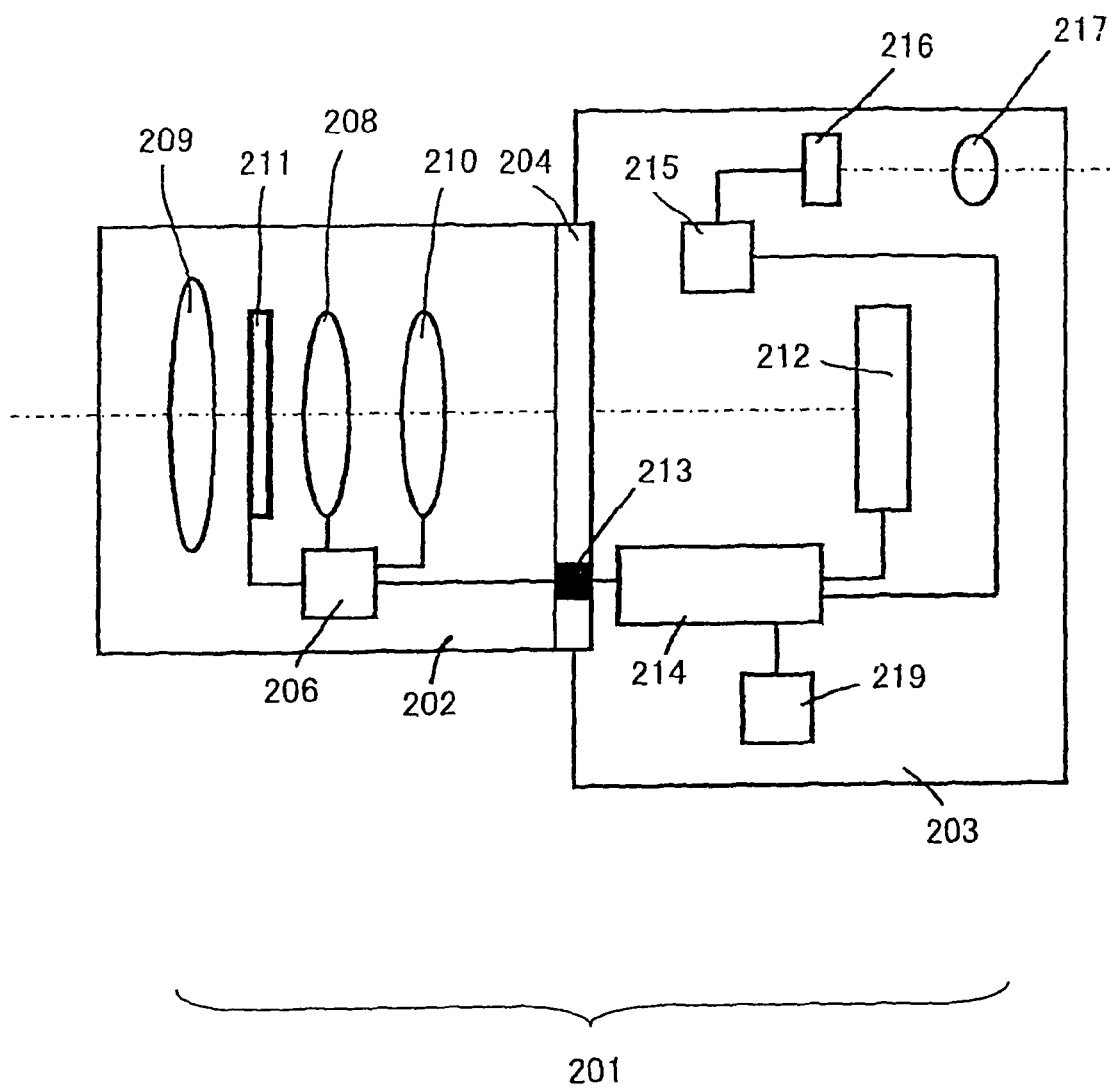
FIG. 1 is a lateral sectional view of the structure adopted in the camera achieved in an embodiment.

A digital still camera used in conjunction with interchangeable lenses, representing an embodiment of the imaging apparatus according to the present invention is now explained. FIG. 1 is a lateral sectional view of the structure adopted in the camera in the embodiment. A digital still camera 201 achieved in the embodiment comprises an interchangeable lens 202 and a camera body 203. The interchangeable lens 202 is mounted at the camera body 203 via a mount unit 204.

The interchangeable lens 202 includes a zooming lens 208, a focusing lens 210, an aperture 211, a lens drive control device 206 and the like. The lens drive control device 206 is constituted with a microcomputer, a memory, a drive control circuit and the like (none shown). The lens drive control device 206 engages in communication with a body drive control device 214 to be detailed later to transmit lens information to the body drive control device and receive camera information from the body drive control device, as well as executing drive control for the focusing lens 210 and the aperture 211 and detecting the states of the zooming lens 208, the focusing lens 210 and the aperture 211.

An image sensor 212, the body drive control device 214, a liquid crystal display element drive circuit 215, a liquid crystal display element 216, an eyepiece lens 217, a memory card 219 and the like are disposed at the camera body 203. Imaging pixels are two-dimensionally arrayed at the image sensor 212 and focus detection pixels are also built into the image sensor over areas corresponding to focus detection positions.

The body drive control device 214 comprises a microcomputer, a memory, a drive control circuit and the like. The body drive control device 214 executes drive control of the image sensor 212, reads out image signals and focus detection signals, processes and records the image signals, executes focus detection calculation based upon the focus detection signals and adjusts the focus in the interchangeable lens 202 and controls camera operations. In addition, the body drive control device 214 engages in communication with the lens drive control device 206 via an electrical contact point 213 to receive the lens information and transmit the camera information (indicating the defocus quantity, the aperture value and the like).

The liquid crystal display element 216 functions as a liquid crystal viewfinder (EVF: electronic viewfinder). A through image (live image) provided by the image sensor 212, brought up on display at the liquid crystal display element 216 by the liquid crystal display element drive circuit 215, can be observed by the photographer via the eyepiece lens 217. The memory card 219 is an image storage medium in which an image captured by the image sensor 212 is stored.

A subject image is formed on the light receiving surface of the image sensor 212 with a light flux having passed through the interchangeable lens 202. The subject image undergoes photoelectric conversion at the image sensor 212 and subsequently, image signals and focus detection signals are transmitted to the body drive control device 214.

The body drive control device 214 calculates the defocus quantity indicating the extent of defocusing based upon focus detection signals output from the focus detection pixels at the image sensor 212 and transmits this defocus quantity to the lens drive control device 206. In addition, the body drive control device 214 processes the image signals provided from the image sensor 212 and stores the processed image signals into the memory card 219. It also provides through image signals from the image sensor 212 to the liquid crystal display element drive circuit 215 so as to bring up a through image on display at the liquid crystal display element 216. Moreover, the body drive control device 214 provides aperture control information to the lens drive control device 206 to enable control of the aperture 211.

The lens drive control device 206 adjusts the lens information in correspondence to the current focusing state, zooming state and aperture setting state, the maximum aperture F number and the like. More specifically, the lens drive control device 206 detects the positions of the zooming lens 208 and the focusing lens 210 and the aperture value set for the aperture 211, and calculates correct lens information based upon the lens positions and the aperture value. Alternatively, it may select the lens information corresponding to the lens positions and the aperture value from a lookup table prepared in advance.

In addition, the lens drive control device 206 calculates a lens drive quantity indicating the extent to which the lens is to be driven based upon the defocus quantity having been received and drives the focusing lens 210 to a focusing point based upon the lens drive quantity. The lens drive control device 206 also drives the aperture 211 in correspondence to the aperture value it has received.

Interchangeable lenses 202 equipped with various image forming optical systems can be mounted at the camera body 203 via the mount unit 204 and the camera body 203 detects the focusing condition of the interchangeable lens 202 currently mounted thereat based upon the output from the focus detection pixels built into the image sensor 212.

Figure 2:
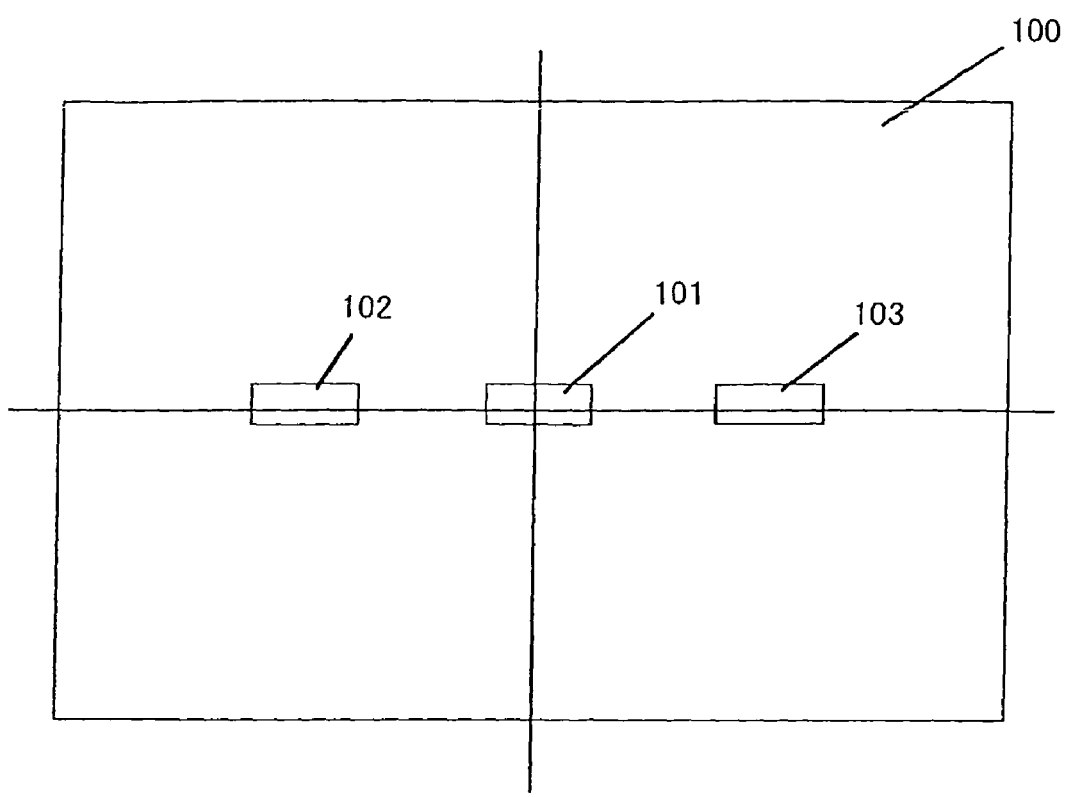
FIG. 2 shows the positions of the focus detection pixels on the photographic image plane.

The positions occupied by the focus detection pixels on the photographic image plane, at which an image is sampled on the photographic image plane for focus detection via focus detection pixel rows to be detailed later (focus detection areas, focus detection positions) are shown in FIG. 2. In this embodiment, three focus detection areas 101 through 103 are set at the center, on the left side and on the right side of a photographic image plane 100. Focus detection pixels are arrayed along a straight line along the longer side of each of the focus detection areas 101 through 103 indicated as rectangular areas in the figure. Normally, the user manually selects a single focus detection area among the focus detection areas 101 through 103 in correspondence to the image composition.

Figure 3:
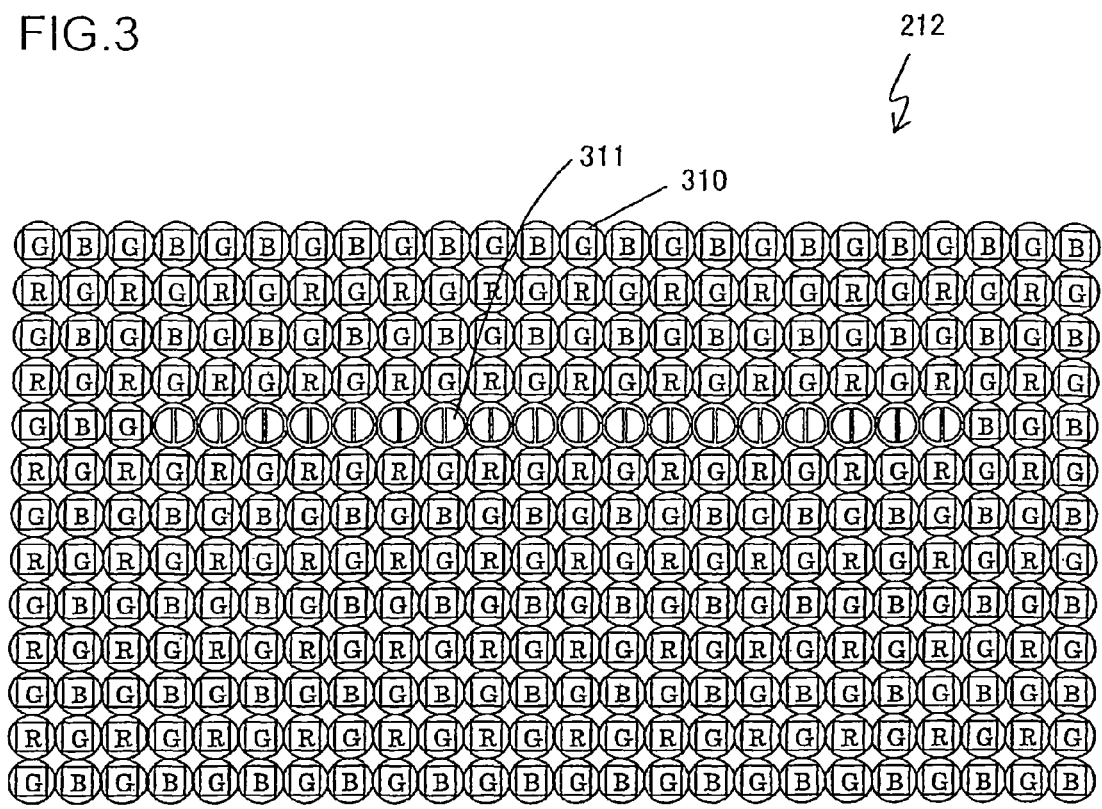
FIG. 3 is a front view showing in detail the structure adopted at the image sensor.

FIG. 3 is a front view showing in detail the structure adopted in the image sensor 212, in an enlargement of the vicinity of the focus detection area 101 set at the center of the photographic image plane in FIG. 2. The longitudinal/lateral orientation (the columns and rows in which the pixels are arrayed) in FIG. 3 matches the longitudinal/lateral orientation of the photographic image plane 100 in FIG. 2. The image sensor 212 is constituted with imaging pixels 310, which include green pixels (G), blue pixels (B) and red pixels (R) and focus detection pixels 311. In the focus detection area 101 (FIG. 2), focus detection pixels 311 are set side-by-side along the horizontal direction. The focus detection pixels 311 are disposed in a dense linear array in a row that would otherwise be occupied by imaging pixels 310 in specific colors, i.e., green pixels (G) and blue pixels (B).

Figure 4:
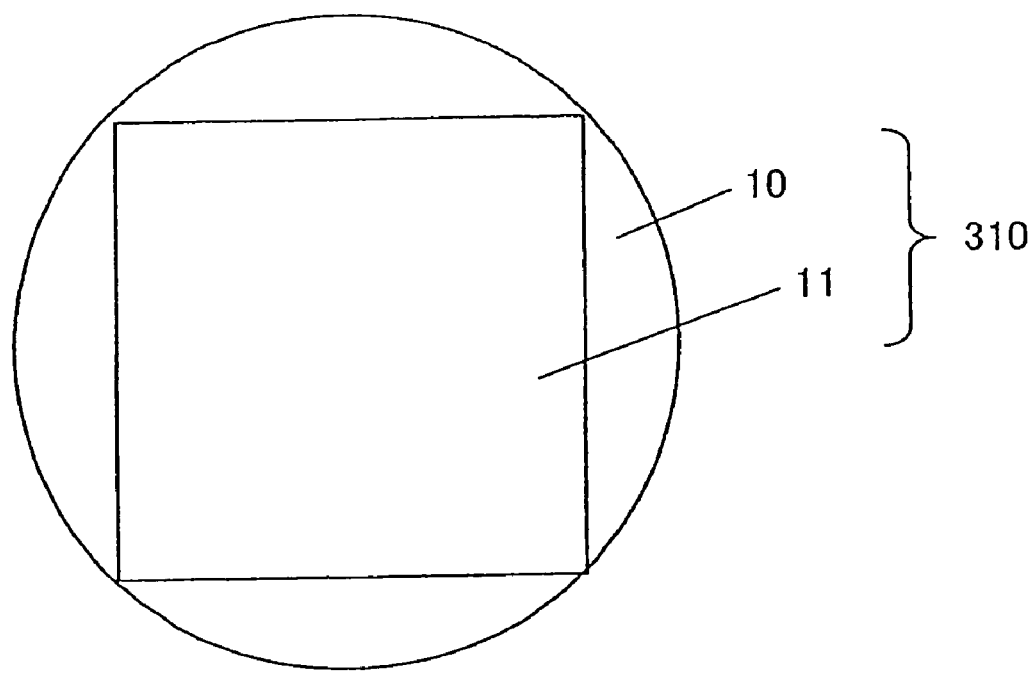
FIG. 4 shows the structure adopted at the imaging pixels.
Figure 6:
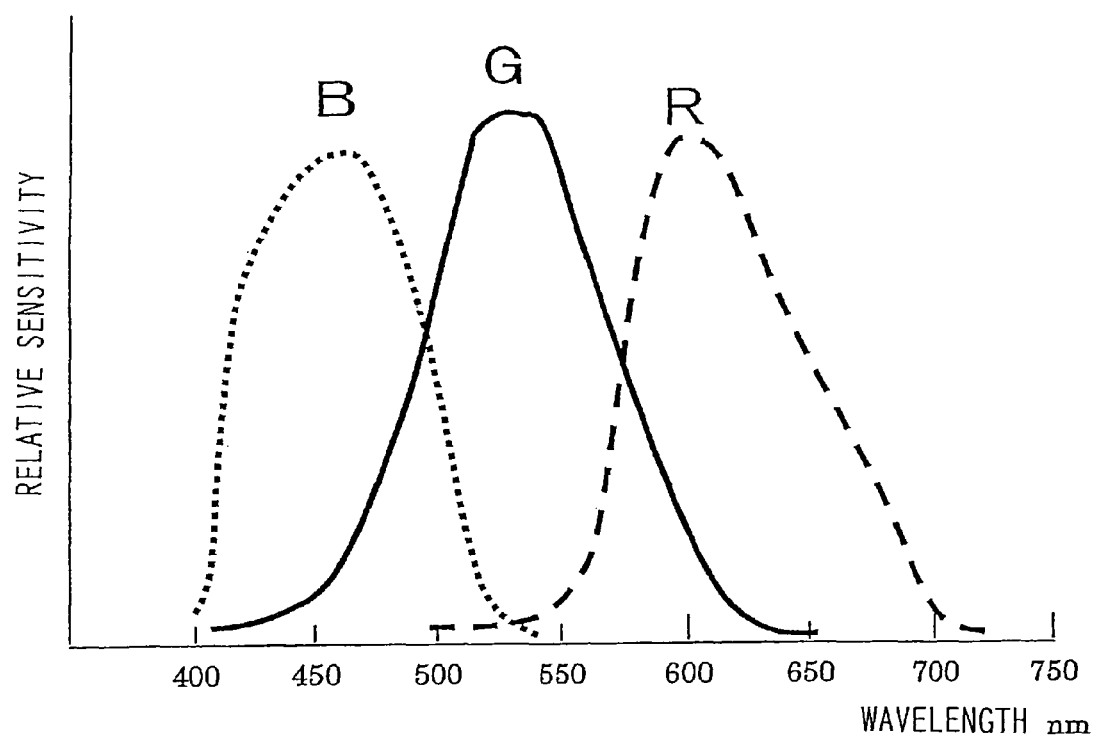
FIG. 6 shows the spectral sensitivity characteristics of the imaging pixels.

As shown in FIG. 4, the imaging pixels 310 each include a micro-lens 10, a photoelectric conversion unit 11 and a color filter (not shown). The color filters at the individual imaging pixels each assume one of the three colors, red (R), green (G) or blue (B). The red, green and blue color filters assume spectral sensitivity characteristics shown in FIG. 6. The imaging pixels, each equipped with a red (R), green (G) or blue (B) color filter, are arranged in a Bayer array at the image sensor 212.

Figure 5:
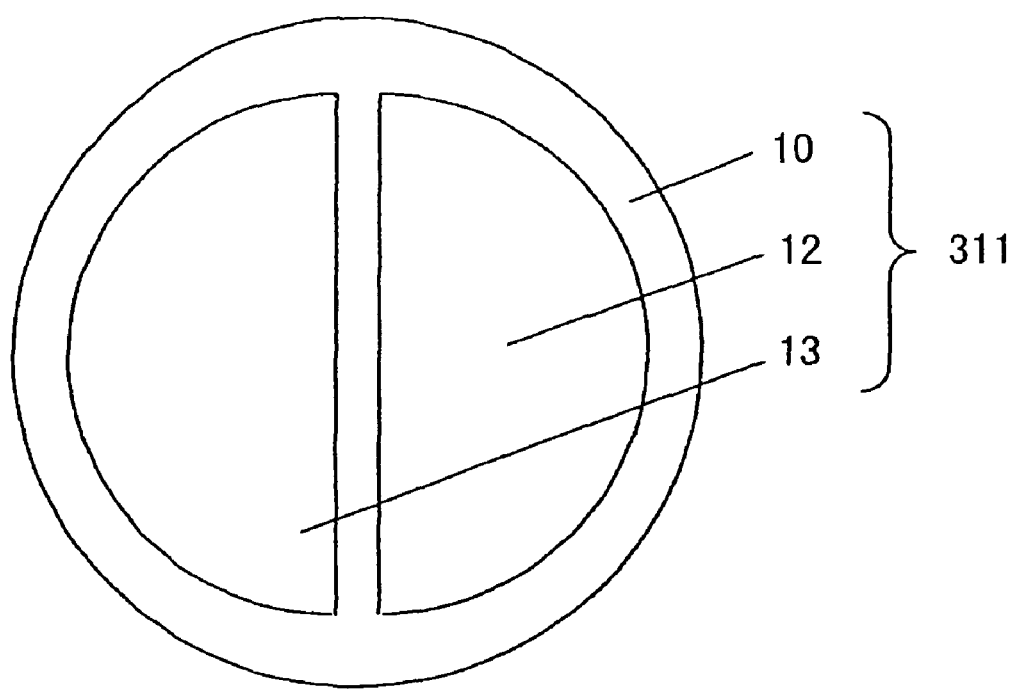
FIG. 5 shows the structure adopted at the focus detection pixels.

As shown in FIG. 5, the focus detection pixels 311 each include a micro-lens 10 and a pair of photoelectric conversion units 12 and 13, with the photoelectric conversion units 12 and 13 each assuming a semicircular shape.

Figure 7:
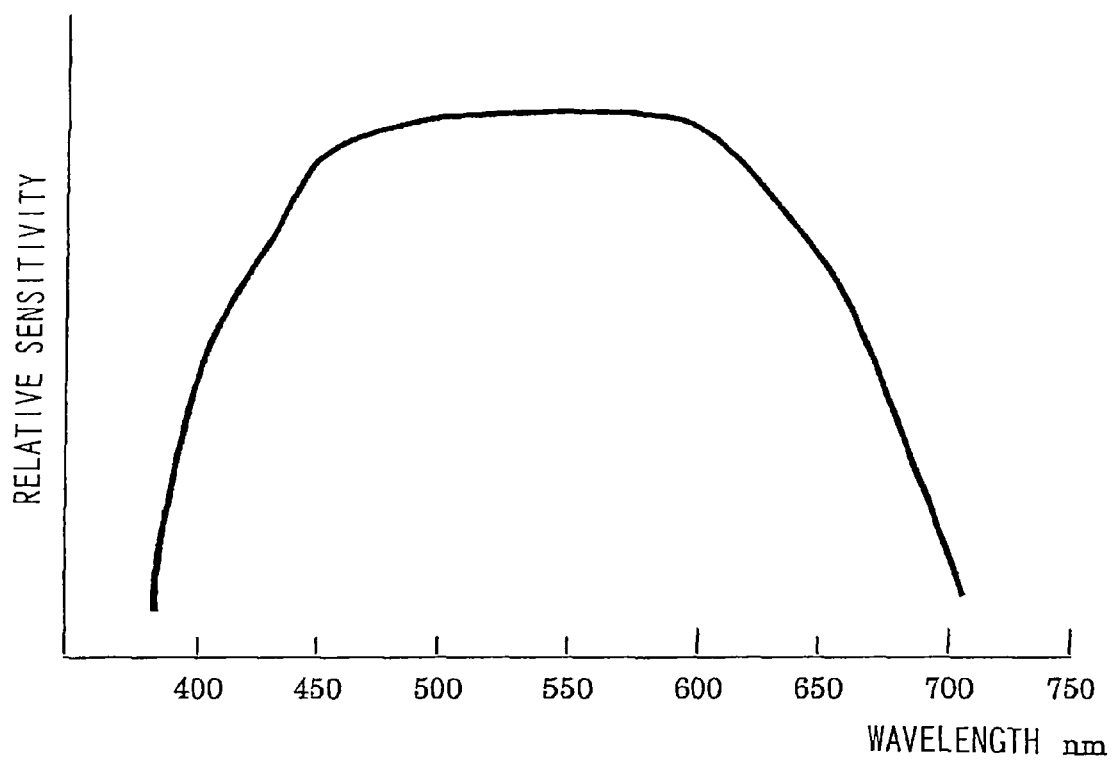
FIG. 7 shows the spectral sensitivity characteristics of the focus detection pixels.

In order to assure a sufficient light quantity, no color filters are disposed at the focus detection pixels 311. The focus detection pixels have the spectral sensitivity characteristics (see FIG. 7), which are achieved by integrating the spectral sensitivity characteristics of the photodiodes engaged in photoelectric conversion and the spectral sensitivity characteristics of the infrared cut filters (not shown). Namely, the spectral sensitivity characteristics are similar to the sum of the spectral sensitivity characteristics of the green pixels (G), the red pixels (R) and the blue pixels (B) shown in FIG. 6, which indicate sensitivity in a light wavelength range containing the light wavelength ranges corresponding to the sensitivity characteristics of all the pixels, i.e., the green pixels, the red pixels and the blue pixels.

The photoelectric conversion unit 11 at the imaging pixel 310 is designed in a shape that allows the photoelectric conversion unit to receive the entire light flux passing through the exit pupil of a higher-speed interchangeable lens (e.g., equivalent to F 1.0) via the micro-lens 10. In addition, the pair of photoelectric conversion units 12 and 13 at each focus detection pixel 311 are designed so as to receive the entire light flux passing through a specific exit pupil (e.g., F 2.8) of the interchangeable lens via the micro-lens 10.

Figure 8:
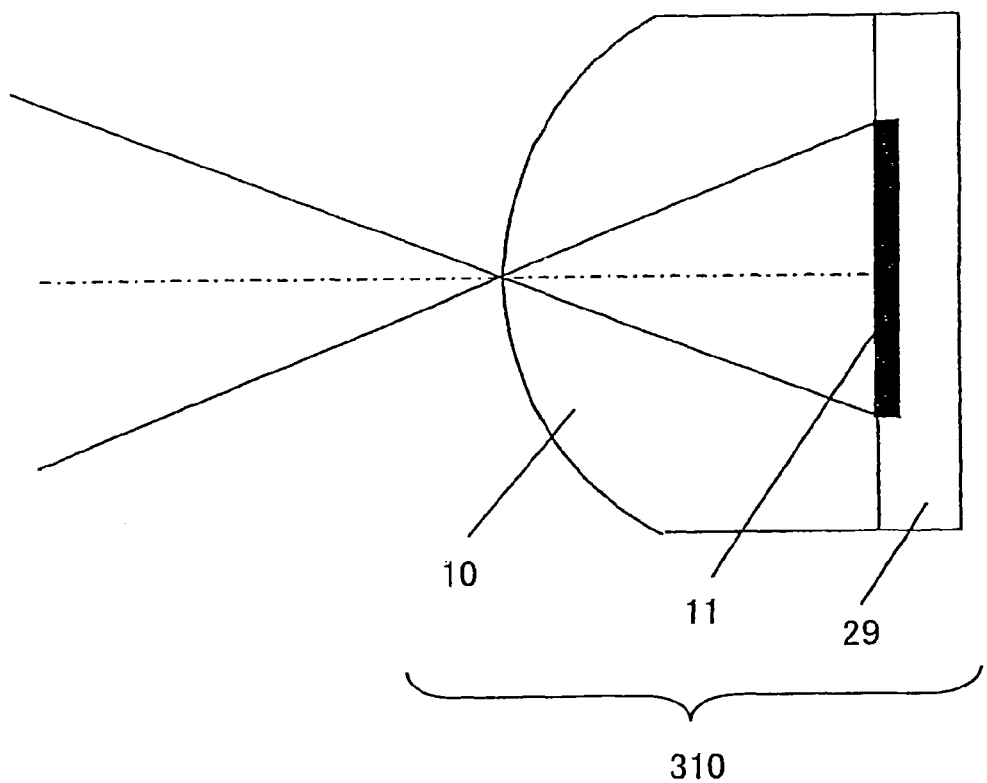
FIG. 8 is a sectional view of an imaging pixel.

FIG. 8 is a sectional view of an imaging pixel 310. The micro-lens 10 is set to the front of the imaging photoelectric conversion unit 11 at the imaging pixel 310 and, as a result, an image of the photoelectric conversion unit 11 is projected frontward via the micro-lens 10. The photoelectric conversion unit 11 is formed on a semiconductor circuit substrate 29 and the color filter (not shown) is disposed between the micro-lens 10 and the photoelectric conversion unit 11.

Figure 9:
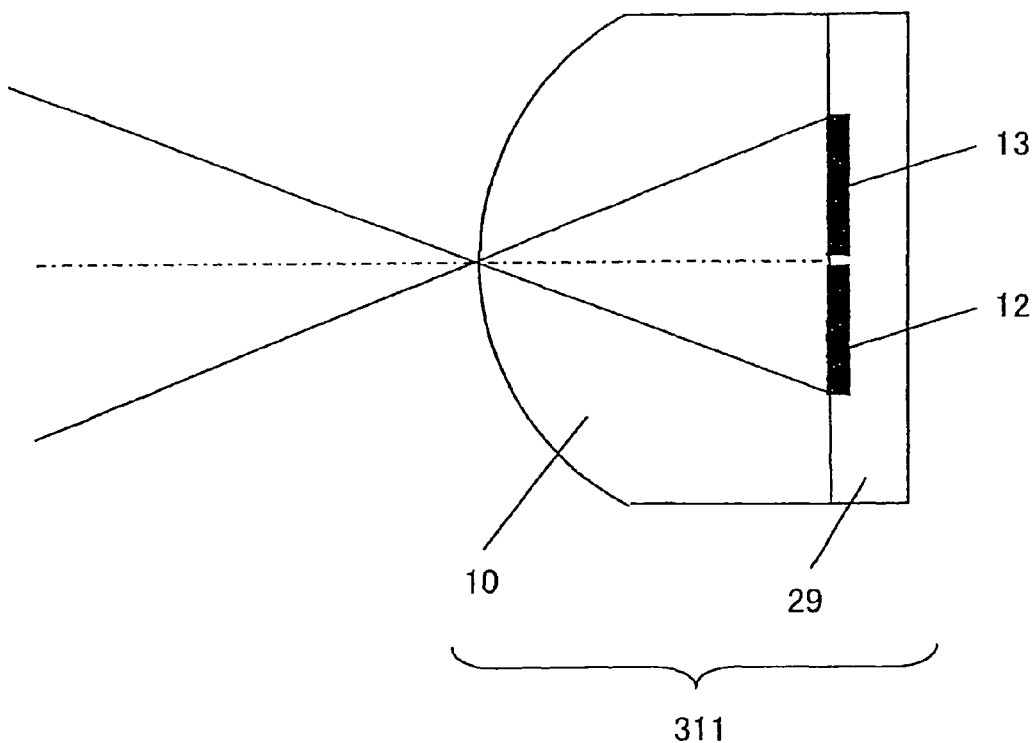
FIG. 9 is a sectional view of a focus detection pixel.

FIG. 9 presents a sectional view of a focus detection pixel 311. The micro-lens 10 is disposed to the front of the pair of photoelectric conversion units 12 and 13 at the focus detection pixel 311 so as to project the photoelectric conversion units 12 and 13 along the frontward direction via the micro-lens 10. The pair of photoelectric conversion units 12 and 13 are formed on the semiconductor circuit substrate 29 and the micro-lens 10 is fixed over the photoelectric conversion units 12 and 13 as an integrated part thereof through a semiconductor image sensor manufacturing process.

Figure 10:
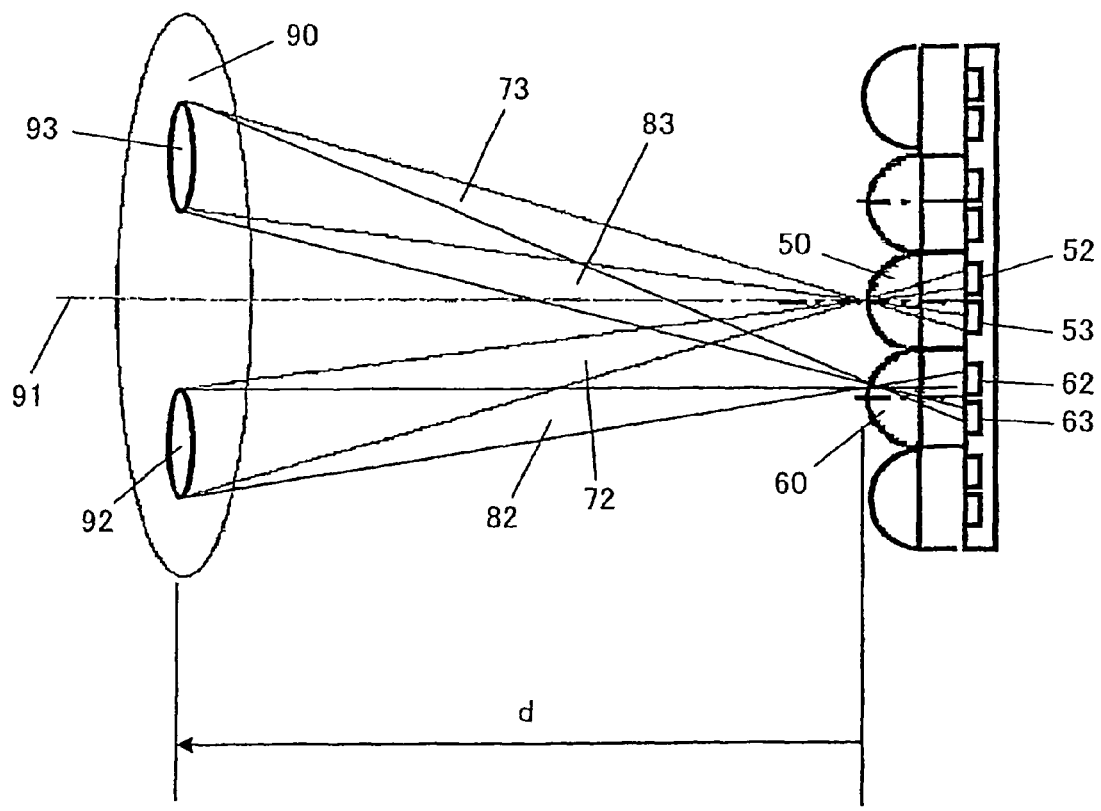
FIG. 10 shows the structure of a focus detection optical system with which the focus is detected via micro-lenses by adopting the split pupil phase detection method.

FIG. 10 shows the structure of a focus detection optical system used to detect the focus through the split pupil phase detection method by using micro-lenses. Reference numeral 90 in the figure indicates the exit pupil set over a distance d along the frontward direction from the micro-lenses disposed near the predetermined imaging plane of the interchangeable lens 202 (see FIG. 1). The distance d is determined in correspondence to the curvature of the micro-lenses, the refractive index of the micro-lenses, the distance between the micro-lenses and the photoelectric conversion units and the like, and is referred to as a range-finding pupil distance in this description. Reference numeral 91 indicates the optical axis of the interchangeable lens, reference numerals 50 and 60 each indicate a micro-lens, reference numerals (52, 53) and (62, 63) indicate photoelectric conversion units corresponding to the micro-lenses 50 and 60 and reference numerals 72, 73 and 82, 83 indicate focus detection light fluxes.

Reference numeral 92 indicates a range defined by the photoelectric conversion units 52 and 62 projected via the micro-lenses 50 and 60 onto the exit pupil 90, and this range is hereafter referred to as a range-finding pupil in the description. Reference numeral 93 indicates a range defined by the photoelectric conversion units 53 and 63 projected via the micro-lenses 50 and 60 onto the exit pupil 90 and hereafter this range is also referred to as a range-finding pupil. It is to be noted that while the range-finding pupils 92 and 93 are shown as elliptical areas in FIG. 10 so as to simplify the illustration, the range-finding pupils actually assume the shape of the photoelectric conversion units 52, 53, 62 and 63 projected onto the exit pupil in an enlarged state.

While FIG. 10 schematically shows a focus detection pixel (constituted with the micro-lens 50 and the pair of photoelectric conversion units 52 and 53) disposed on the optical axis 91 and an adjacent focus detection pixel (constituted with the micro-lens 60 and the pair of photoelectric conversion units 62 and 63), the pairs of photoelectric conversion units of other focus detection pixels, too, receive light fluxes arriving at their micro-lenses from the pair of range-finding pupils 92 and 93. It is to be noted that the focus detection pixels are arrayed in a direction matching the direction in which the pair of range-finding pupils are set side-by-side, i.e., the direction along which the pair of photo electric conversion units are set side-by-side.

The micro-lenses 50 and 60 are disposed near the predetermined imaging plane of the optical system. The shapes of the pair of photoelectric conversion units 52 and 53 disposed behind the micro-lens 50 set on the optical axis 91 are projected via the micro-lens 50 onto the exit pupil 90 set apart from the micro-lenses 50 and 60 by the range-finding pupil distance d, and the projected shapes define the range-finding pupils 92 and 93. The shapes of the pair of photoelectric conversion units 62 and 63 disposed behind the micro-lens 60 next to the micro-lens 50 are projected via the micro-lens 60 onto the exit pupil 90 set apart by the range-finding pupil distance d, and the projected shapes define the range-finding pupils 92 and 93. Namely, the positional relationship between the micro-lens and the photoelectric conversion units at each pixel is determined so that the projected shapes (range-finding pupils 92 and 93) of the photoelectric conversion units at the various focus detection pixels are aligned on the exit pupil 90 located over the range-finding pupil distance d.

The photoelectric conversion unit 52 outputs a signal corresponding to the intensity of an image formed on the micro-lens 50 with the focus detection light flux 72 having passed through the range-finding pupil 92 and having advanced toward the micro-lens 50. The photoelectric conversion unit 53 outputs a signal corresponding to the intensity of an image formed on the micro-lens 50 with the focus detection light flux 73 having passed through the range-finding pupil 93 and having advanced toward the micro-lens 50. The photoelectric conversion unit 62 outputs a signal corresponding to the intensity of an image formed on the micro-lens 60 with the focus detection light flux 82 having passed through the range-finding pupil 92 and having advanced toward the micro-lens 60. The photoelectric conversion unit 63 outputs a signal corresponding to the intensity of an image formed on the micro-lens 60 with the focus detection light flux 83 having passed through the range-finding pupil 93 and having advanced toward the micro-lens 60.

By linearly disposing a large number of focus detection pixels each structured as described above and integrating the outputs from the pairs of photoelectric conversion units at the individual focus detection pixels into output groups each corresponding to one of the two range-finding pupils 92 and 93, information related to the intensity distribution of the pair of images formed on the focus detection pixel row with the individual focus detection light fluxes passing through the range-finding pupil 92 and the range-finding pupil 93 is obtained. Image misalignment detection arithmetic processing (correlation arithmetic processing, phase detection processing), to be detailed later, is subsequently executed by using the information thus obtained so as to detect the extent of image misalignment (shift) manifested by the pair of images through the split-pupil detection method. Then, by executing specific conversion processing on the image shift quantity, the deviation (defocus quantity) of the current image forming plane (the image forming plane at the focus detection position corresponding to the position assumed by the micro-lens array on the predetermined imaging plane), relative to the predetermined imaging plane, is calculated.

The phenomenon in which the quality of the image in the vicinity of the focus detection pixels is degraded in image data obtained through pixel interpolation processing is now explained. While the image quality may be improved to some extent by assuring better performance in the pixel interpolation processing, a more comprehensive improvement in the image quality still needs to be assured. A great number of sets of image data were collected and examined and the results of the examination revealed that the deterioration of image quality could be attributed to crosstalk from a focus detection pixel to an imaging pixel. In even more specific terms, it was learned that crosstalk occurred in varying extents depending upon whether a nearby pixel was a focus detection pixel or an imaging pixel.

Such crosstalk may be caused by; (1) diffusion of electrons, generated at an end of, or deep inside a photoelectric conversion unit by incoming light inside the semiconductor substrate at which the photoelectric conversion units are formed, to nearby photoelectric conversion units, (2) light reflected and propagated between the light shielding metal layer and the wiring metal layer formed at the semiconductor surface; and (3) part of the light having entered a focus detection pixel reflected to the outside of the focus detection pixel, the reflected light reflected further at a glass cover or the like on the sensor package and entering nearby imaging pixels. The occurrence of such crosstalk from a focus detection pixel to an imaging pixel leads to degradation of image data output from the imaging pixel present near the focus detection pixel and ultimately leads to poor quality image data generated in correspondence to the focus detection pixel position by using such image data from the imaging pixels.

Figure 11:
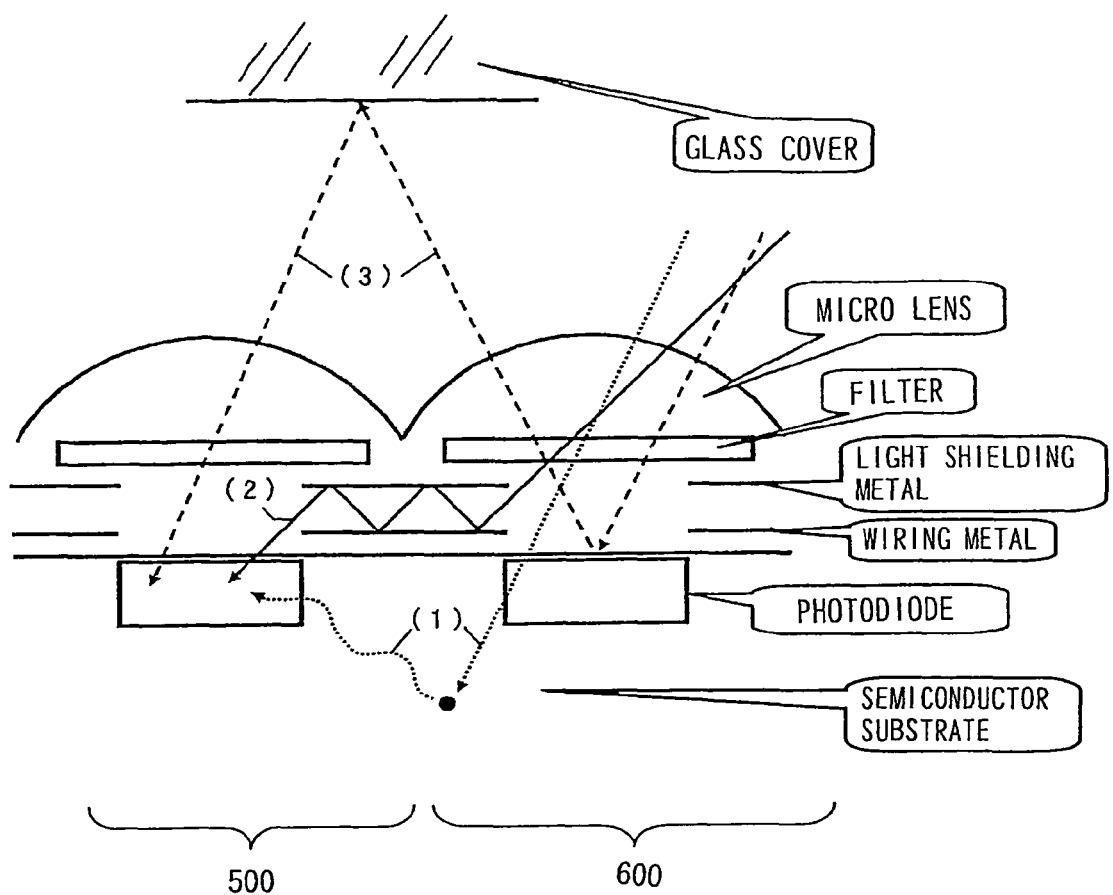
FIG. 11 illustrates how crosstalk may occur at imaging pixels.

The crosstalk phenomenon is explained in further detail. FIG. 11 illustrates how crosstalk may occur at an imaging pixel in a sectional view of an imaging pixel 500 and a focus detection pixel 600. The imaging pixel 500 and the focus detection pixel 600 are each constituted with a micro-lens, a filter, a light shielding metal, a wiring metal and a photodiode formed on the semiconductor substrate. It is to be noted that the focus detection pixel 600 does not need to include a filter.

Crosstalk occurs due to the cause (1) described above in the structure shown in FIG. 11, as light having entered the photoelectric conversion unit (photodiode) in the focus detection pixel 600 undergoes photoelectric conversion outside or deep within the photodiode, thereby generating electrons and the electrons are diffused and enter the photoelectric conversion unit of the adjacent imaging pixel 500. Crosstalk occurs due to the cause (2) as light having entered the focus detection pixel 600 is reflected and propagated through the gap between the light shielding metal and the wiring metal and spills into the photoelectric conversion unit in the adjacent imaging pixel 500. Crosstalk also occurs due to the cause (3) as light having entered the focus detection pixel 600 is reflected at the photodiode or the like and exits the focus detection pixel, the reflected light is further reflected at the glass cover of the sensor package, the optical low pass filter, the infrared filter or the like and the light then enters and leaks into the photoelectric conversion unit of the adjacent imaging pixel.

Regardless of the cause of the crosstalk, (1), (2) or (3), the extent to which the crosstalk negatively affects the image changes in correspondence to the angle of the incoming light and the extent of crosstalk tends to increase as the angle formed by the incoming light and the optical axis of the micro-lens increases. While a light beam having passed through a range-finding pupil (e.g., 92 or 93 in FIG. 10) enters a photoelectric conversion unit in a focus detection pixel in principle, a light beam that would induce crosstalk also enters the focus detection pixel from an area other than the range-finding pupil. Under normal circumstances, the angle of incidence of a light beam having passed through a peripheral area of the aperture opening at the photographic lens and entering the focus detection pixel is greater than the angle of incidence of a light beam entering the focus detection pixel after passing through a central area of the aperture opening and, for this reason, the light beam having passed through the peripheral area of the aperture opening is bound to manifest a greater extent of crosstalk. Since the extent of crosstalk is affected by the aperture opening F number at the photographic lens, as described above the crosstalk rate to be used in crosstalk correction is measured in correspondence to the aperture opening F number of the photographic lens and the measured value is stored as data in correspondence to the aperture opening F number, the aperture opening F number data are received from the lens drive control device 206 (FIG. 1) when crosstalk correction must be executed, and crosstalk correction is executed on the image data at imaging pixels based upon the crosstalk rate corresponding to the aperture opening F number.

In addition, crosstalk caused by (1) manifests to a greater extent when the light has a larger wavelength (red light), which penetrates the semiconductor substrate to a greater depth. In order to correct such a fluctuation in the crosstalk rate attributable to the light wavelength, in correspondence to the spectral distribution characteristics of the incoming light, the crosstalk rate spectral characteristics may be measured and stored in advance, the spectral distribution characteristics of an incoming light beam entering the focus detection pixel during an imaging operation are determined based upon the RGB output from the imaging pixels around the focus detection pixel, and the crosstalk rate used in the crosstalk correction may be corrected based on the incoming light spectral distribution characteristics thus measured and the stored crosstalk rate spectral characteristics.

In the case of crosstalk caused by (3), the light beam, which is to cause the crosstalk, passes through the filter of a crosstalk recipient pixel and thus, the crosstalk rate fluctuates in correspondence to the wavelength of the light causing the crosstalk. In order to correct such a fluctuation of the crosstalk rate in correspondence to the spectral distribution characteristics of the incoming light, the crosstalk rate spectral characteristics relative to the spectral distribution (filter wavelength characteristics) at the crosstalk recipient imaging pixel may be measured and stored in advance, the spectral distribution characteristics of the incoming light beam entering the focus detection pixel during an imaging operation may be determined based upon the RGB output from the imaging pixels present around the focus detection pixel and the crosstalk rate used in the crosstalk correction may be corrected based upon the spectral distribution (filter wavelength characteristics) of the crosstalk recipient imaging pixel, the incoming light spectral distribution characteristics having been measured and the stored crosstalk rate spectral characteristics.

Figure 12:
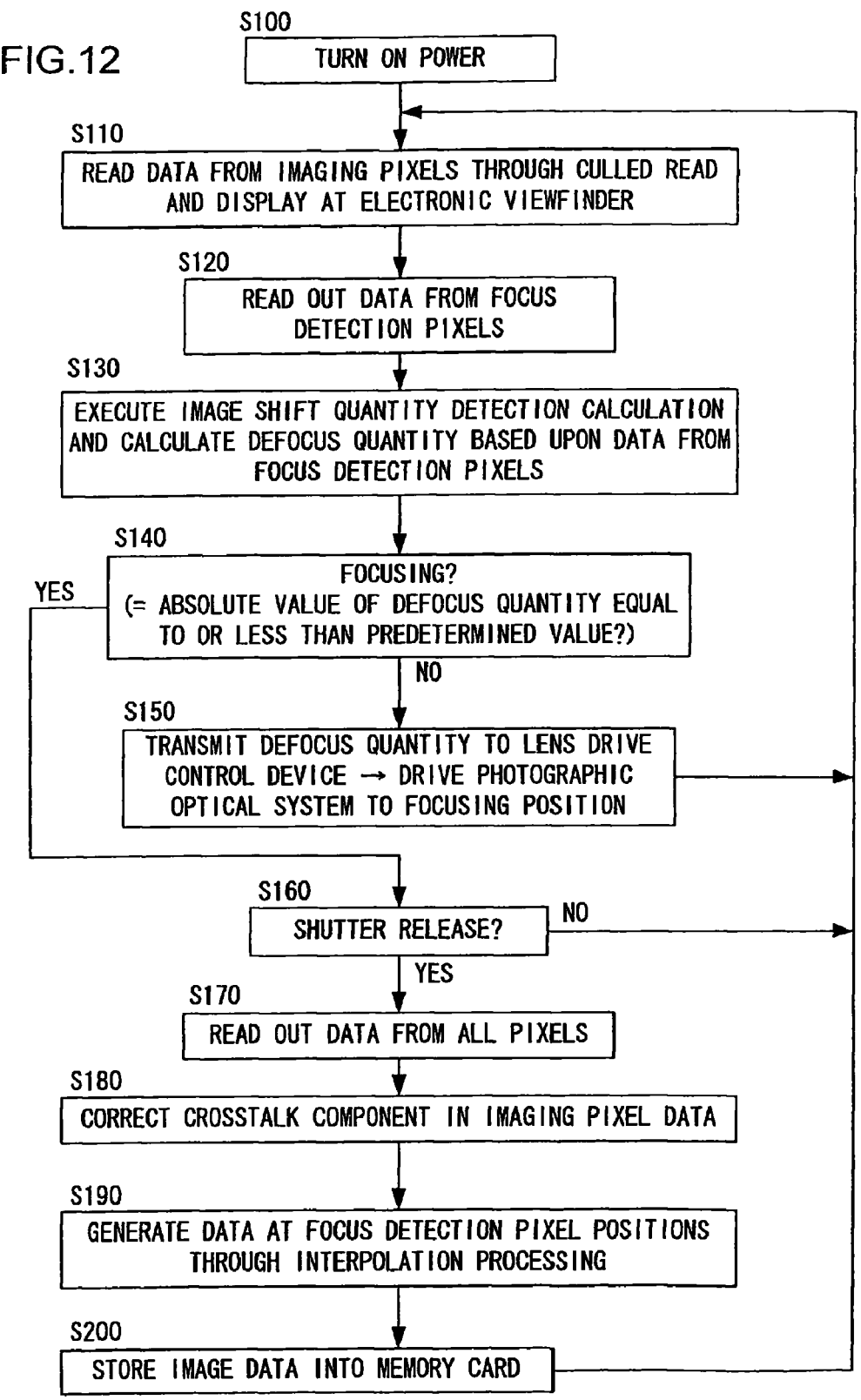
FIG. 12 presents a flowchart of the imaging operation executed in the digital still camera (imaging apparatus) in FIG. 1.

FIG. 12 presents a flowchart of the imaging operation executed in the digital still camera achieved in the embodiment (imaging apparatus). The body drive control device 214 starts the imaging operation as the power switch (not shown) of the camera is turned on in step 100. In the following step 110, image data from the imaging pixels are read out through a culled read (a sub-sampling read) and the image data thus read out are brought up on display at the electronic viewfinder. In step 120, a pair of sets of image data corresponding to a pair of images are read out from a focus detection pixel row. It is assumed that a specific focus detection area has been selected by the user via a focus detection area selector switch (not shown). In step 130, image misalignment detection calculation processing (correlation operation processing) is executed based upon the pair of sets of image data having been read out, an image shift quantity is determined through arithmetic operation and the image shift quantity is then converted to the defocus quantity. It is to be noted that the correlation operation processing is to be described in detail later.

In step 140, a decision is made as to whether or not the current condition is close to a focusing state, i.e., whether or not the absolute value of the defocus quantity having been calculated is equal to or less than a predetermined value. If it is decided that the current condition is not close to the focusing state, the operation proceeds to step 150 to transmit the defocus quantity to the lens drive control device 206 which then drives the focusing lens 208 at the interchangeable lens 202 to the focusing position. Subsequently, the operation returns to step 110 to repeatedly execute the operation described above. It is to be noted that the operation also branches to this step if focus detection is not possible, to transmit a scan drive instruction to the lens drive control device 206. In response, the lens drive control device drives the focusing lens 208 at the interchangeable lens 202 to scan between the infinity position and the close-up position. The operation then returns to step 110 to repeatedly execute the operation described above.

If, on the other hand, it is decided that the current condition is close to the focusing state, the operation proceeds to step 160 to make a decision as to whether or not a shutter release operation has been performed via the shutter release button (not shown). If it is decided that a shutter release operation has not yet been performed, the operation returns to step 110 to repeatedly execute the operation described above. If it is decided that a shutter release operation has been performed, the operation proceeds to step 170 to transmit an aperture adjustment instruction to the lens drive control device 206 and thus set the aperture at the interchangeable lens 202 to a control F number (F number selected by the user or set automatically). As the aperture control ends, the image sensor 212 is engaged in an imaging operation and image data originating from the imaging pixels and all the focus detection pixels at the image sensor 212 are read out.

In step 180, crosstalk correction is executed as detailed later for the data at the imaging pixels present around the focus detection pixels based upon the data at the focus detection pixels near the imaging pixels. In the following step 190, image data at positions assumed by the individual pixels in the focus detection pixel rows are generated through interpolation based upon the image data at imaging pixels present near the focus detection pixels. In step 200, image data constituted with the data at the imaging pixels and the interpolated image data are recorded into the memory card 219, and then the operation returns to step 110 to repeatedly execute the operation described above.

Next, the image misalignment detection calculation processing (correlation operation processing) executed in step 130 in FIG. 12 is described in detail. Since the balance between the amounts of light in the pair of images detected by a focus detection pixel may not be in balance due to vignetting of the range-finding pupils by the lens aperture opening, a specific type of correlation operation that assures the required level of image misalignment detection accuracy even when the light amounts are not in balance is executed.

A correlation quantity C(k) indicating the level of correlation is calculated as expressed in (1), through the correlation operation of the specific type that assures the required level of image misalignment detection accuracy even when the light amounts are not in balance, executed on a pair of data strings (A11~A1M, A21~A2M: M indicates the number of sets of data) read out from the focus detection pixel row.

$$C(k) = \Sigma |A1_n \cdot A2_{n+1+k} - A2_{n+k} \cdot A1_{n+1}| \quad (1)$$

In expression (1), the Σ operation is cumulatively executed with regard to n and the range assumed for n is limited to the range over which the data $A1_n, A1_{n+1}, A2_{n+k}$ and $A2_{n+1+k}$ exist in correspondence to the shift quantity k. In addition, the shift quantity k is an integer which represents a relative shift quantity assuming a value taken in units matching the data interval with which the data in the data strings are sampled.

Figure 13A:
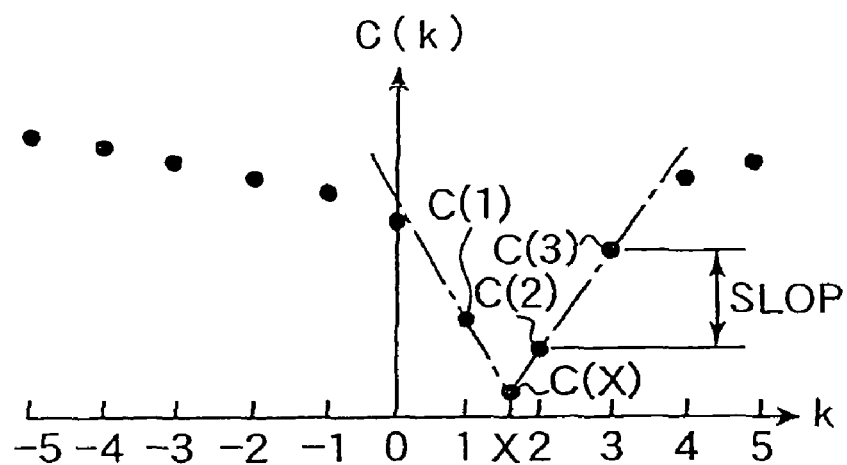
FIGS. 13A~13C illustrate a method that may be adopted when evaluating the correlation calculation results.

The results of the arithmetic operation executed as expressed in (1) may indicate that the correlation quantity C(k) assumes the smallest value (the smaller the value, the higher the correlation level) at the shift quantity at which the pair of sets of data achieve a high level of correlation (when k=kj=2 in FIG. 13A). The shift quantity x, which gives the smallest-value C(x) in the continuous correlation quantity graph, is determined by adopting a three-point interpolation method expressed in (2)~(5) below.

$$x = kj + D/\text{SLOP} \quad (2)$$

$$C(x) = C(kj) - |D| \quad (3)$$

$$D = \{C(kj-1) - C(kj+1)\}/2 \quad (4)$$

$$\text{SLOP} = \text{MAX}\{C(kj+1) - C(kj), C(kj-1) - C(kj)\} \quad (5)$$

Figure 13B:
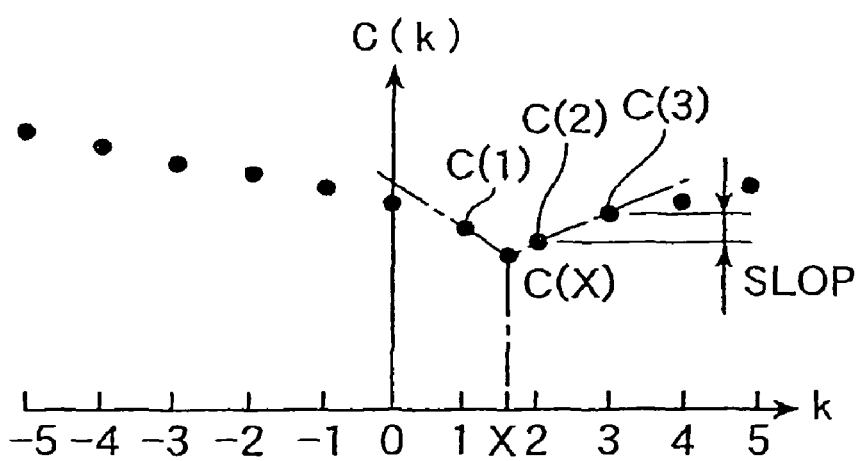

The judgment as to whether or not the shift quantity x calculated as expressed in (2) is reliable is made as follows. As shown in FIG. 13B, the interpolated minimum value C(x) of the correlation quantity increases when the level of correlation between the pair of sets of data is lower. Accordingly, if C(x) is equal to or greater than a predetermined threshold value, the calculated shift quantity is judged to be less reliable and the calculated shift quantity x is canceled. Alternatively, C(x) may be standardized with regard to the data contrast, and in such a case, if the value obtained by dividing C(x) by SLOP indicating a value in proportion to the contrast is equal to or greater than a predetermined value, the calculated shift quantity should be judged to be not reliable and accordingly, the calculated shift quantity x should be canceled. As a further alternative, if SLOP indicating the value in proportion to the contrast is equal to or less than a predetermined value, the subject should be judged to be a low-contrast subject. Accordingly, the reliability of the calculated shift quantity should be judged to below and the calculated shift quantity x should be canceled.

Figure 13C:
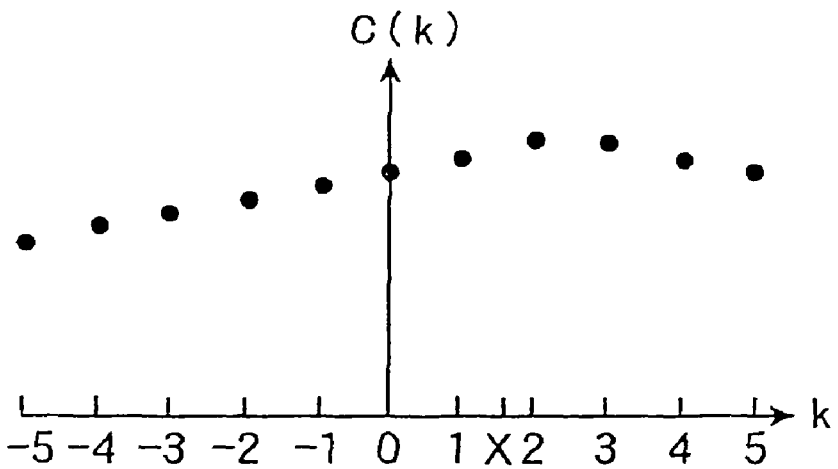

If the level of correlation between the pair of sets of data is low and the correlation quantity C(k) does not dip at all over the shift range kmin to kmax, as shown in FIG. 13C, the minimum value C(x) cannot be determined. In this case, it is decided that focus detection cannot be executed.

It is to be noted that the correlation quantity C(k) may be calculated in the embodiment through a correlation operation other than that expressed in (1), as long as the required level of image misalignment detection accuracy is assured even though the range-finding pupils are vignetted by the lens aperture opening and the light amounts are not in balance.

If the calculated shift quantity x is judged to be reliable, the calculated shift quantity is converted to an image shift quantity shft, as expressed in (6).

$$\text{shft} = PY \cdot x \quad (6)$$

PY in expression (6) represents the detection pitch (the pitch at which the focus detection pixels are disposed). The image shift quantity shft calculated as expressed in (6) is then converted to a defocus quantity def by multiplying the image shift quantity shft by a predetermined conversion coefficient k.

$$\text{def} = k \cdot \text{shft} \quad (7)$$

Figure 14:
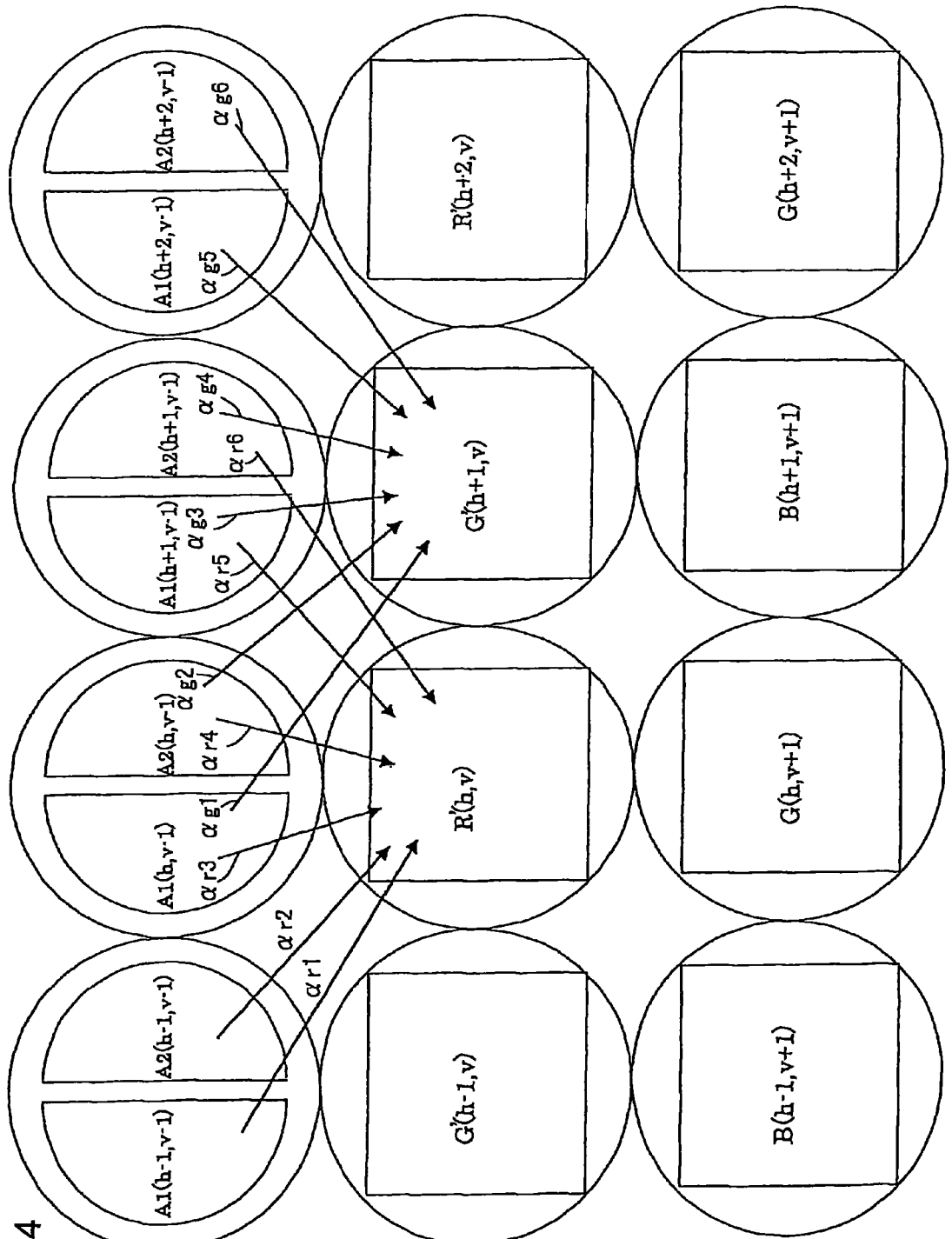
FIG. 14 illustrates crosstalk occurring at imaging pixels.
Figure 15:
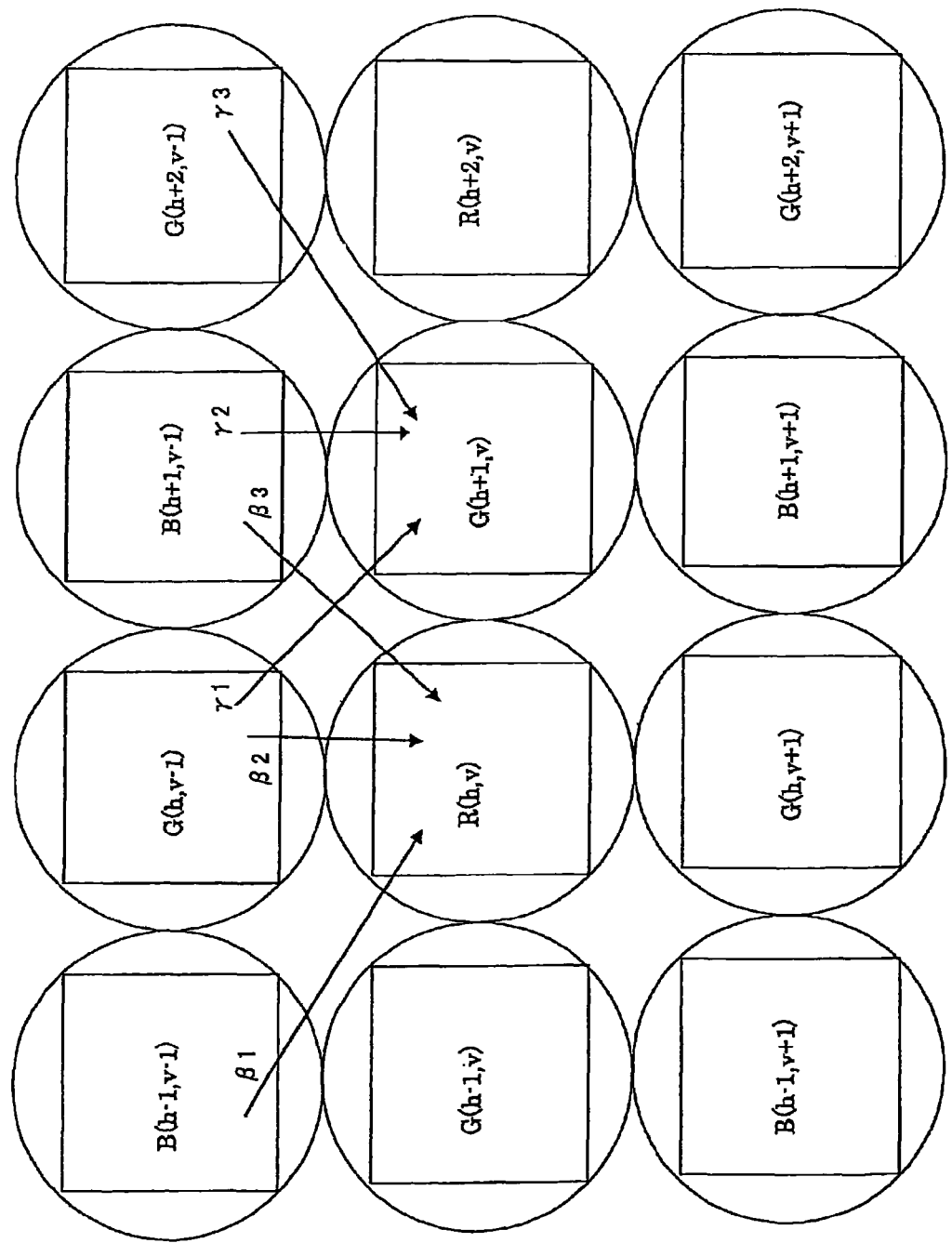
FIG. 15 illustrates crosstalk occurring at imaging pixels.

Next, the crosstalk correction processing executed in step 180 in FIG. 12 is explained. FIGS. 14 and 15 each illustrate crosstalk occurring at imaging pixels 311, with FIG. 14 illustrating crosstalk at imaging pixels set next to focus detection pixels and FIG. 15 illustrating crosstalk occurring at imaging pixels that are not set adjacent to focus detection pixels. h and v are variables used to indicate the position of a specific pixel assumed along the horizontal direction and the vertical direction in the two-dimensional pixel array shown in FIG. 3. For instance, from a focus detection pixel set in the hth column and the vth row, a pair of sets of focus detection signal data A1(h, v) and A2(h, v) are output, from an R imaging pixel set in the hth column and the vth row, image data R(h, v) and R'(h, v) are output, from a G imaging pixel set in the hth column and the vth row, image data G(h, v) and G'(h, v) are output and from a B imaging pixel set in the hth column and the vth row, image data B(h, v) and B'(h, v) are output.

In reference to FIG. 14, the correction of the image data R'(h, v) from the R imaging pixel at the hth column/vth row adjacent to a focus detection pixel and the image data G'(h+1, v) at the G imaging pixel at the h+1th column/vth row also adjacent to a focus detection pixel, executed based upon the focus detection signal data from the adjacent focus detection pixels, is examined. It is assumed that the R imaging pixel and the G imaging pixel each receive crosstalk (output leak) from the four pixels adjacent to it on the upper side, the lower side, the left side and the right side and the four pixels adjacent to it along the diagonal directions.

As is obvious from the comparison of FIGS. 14 and 15, the difference between the extent of crosstalk at an R imaging pixel or a G imaging pixel that is not adjacent to a focus detection pixel and the extent of crosstalk occurring at an R imaging pixel or a G imaging pixel adjacent to a focus detection pixel can be determined by subtracting the extents of crosstalk attributable to the three imaging pixels in the v−1th row adjacent to the R imaging pixel or the G imaging pixel in FIG. 15 from the extent of crosstalk attributable to the three focus detection pixels in the v−1th row adjacent to the R imaging pixel or the G imaging pixel shown in FIG. 14.

In the description, the term "crosstalk rate" is used to refer to the ratio calculated by dividing an output (crosstalk) leaking from a photoelectric conversion unit to another photoelectric conversion unit by the output from the particular photoelectric conversion unit. In FIG. 14, the crosstalk-rate of the crosstalk from a focus detection pixel to the R imaging pixel is indicated as $\alpha ri$ (i=1~6), whereas the crosstalk rate of the crosstalk from a focus detection pixel to the G imaging pixel is indicated as $\alpha gi$ (i=1~6). In addition, in FIG. 15, the crosstalk rate of the crosstalk from an adjacent imaging pixel to the R imaging pixel is indicated as $\beta i$ (i=1~3) and the rate of crosstalk from an adjacent imaging pixel to the G imaging pixel is indicated as $\gamma i$ (i=1~3).

The extent of crosstalk is affected by the distance between the photoelectric conversion units and accordingly, the crosstalk rate of crosstalk from a photoelectric conversion means assuming a given structure can be adjusted in correspondence to the distance. In addition, since the extent of crosstalk is affected by the wavelength sensitivity of the imaging pixel, the crosstalk rate of the crosstalk to an R imaging pixel and the crosstalk rate of the crosstalk to a G imaging pixel can be set separately in crosstalk correction.

The crosstalk rates $\alpha ri$, $\alpha gi$, $\beta i$ and $\gamma i$ are calculated through theoretical reasoning or through testing and are stored in advance in the body drive control device 214 (see FIG. 1). For instance, the crosstalk rates may be obtained through testing by forming a single focus detection pixel and a single imaging pixel, each surrounded by imaging pixels shielded from light so as to disallow entry of the imaging light fluxes into the photoelectric conversion units thereof, e.g., by shielding the photoelectric conversion unit surfaces with metal, applying a light shielding coatings onto the micro lens surfaces or substituting light shielding members for the filters), and then sampling the image data and the focus detection signal data output from the imaging pixel and the focus detection pixel and the signal data output from the shielded pixels disposed around them as light is radiated onto the single focus detection pixel and the single imaging pixel.

With R(h, v) and G(h+1, v) respectively representing the image data at the R imaging pixel and the G imaging pixel each surrounded by imaging pixels only, as shown in FIG. 15, image data R'(h, v) and G'(h+1, v), affected by crosstalk from the focus detection pixels, as shown in FIG. 14, may be expressed as follows $$R'(h, v)=R(h, v)+\alpha r1 \cdot A1(h-1, v-1)+\alpha r2 \cdot A2(h-1, v-1)+\alpha r3 \cdot A1(h, v-1)+\alpha r4 \cdot A2(h, v-1)+\alpha r5 \cdot A1(h+1, v-1)+\alpha r6 \cdot A2(h+1, v-1)-\beta 1 \cdot B(h-1, v-1)-\beta 2 \cdot G(h, v-1)-\beta 3 \cdot B(h+1, v-1),$$

$$G'(h+1, v)=G(h+1, v)+\alpha g1 \cdot A1(h, v-1)+\alpha g2 \cdot A2(h, v-1)+\alpha g3 \cdot A1(h+1, v-1)+\alpha g4 \cdot A2(h+1, v-1)+\alpha g5 \cdot A1(h+2, v-1)+\alpha g6 \cdot A2(h+2, v-1)-\gamma 1 \cdot G(h, v-1)-\gamma 2 \cdot B(h+1, v-1)-\gamma 3 \cdot G(h+2, v-1) \quad (8)$$

Since image data B(h−1, v−1) and B(h+1, v−1) at B imaging pixels and image data G(h−1, v−1) and G(h+1, v−1) at G imaging pixels in expression (8) cannot be actually obtained, they are approximated based upon the focus detection signal data at the focus detection pixels as expressed in (9).

$$B(h-1, v-1)=\eta b \cdot (A1(h-1, v-1)+A2(h-1, v-1)),$$

$$B(h+1, v-1)=\eta b \cdot (A1(h+1, v-1)+A2(h+1, v-1)),$$

$$G(h, v-1)=\eta g \cdot (A1(h, v-1)+A2(h, v-1)),$$

$$G(h+2, v-1)=\eta g \cdot (A1(h+2, v-1)+A2(h+2, v-1)), \quad (9)$$

$\eta b$ and $\eta g$ in expression (9) represent conversion coefficients used to convert in approximation the focus detection signal data at the focus detection pixels to the image data at B imaging pixels and G imaging pixels and these conversion coefficients should be determined in advance through theoretical reasoning or testing and stored into the body drive control device 214 (see FIG. 1).

By incorporating expression (9) in expression (8) for substitution, the image data R(h, v) at the R imaging pixel and the image data G(h+1, v) at the G imaging pixel each surrounded by imaging pixels only can be calculated as expressed in (10)

$$R(h, v)=R'(h, v)-(\alpha r1-\beta 1 \eta b) \cdot A1(h-1, v-1)-(\alpha r2-\beta 1 \eta b) \cdot A2(h-1, v-1)-(\alpha r3-\beta 2 \eta g) \cdot A1(h, v-1)-(\alpha r4-\beta 2 \eta g) \cdot A2(h, v-1)-(\alpha r5-\beta 3 \eta b) \cdot A1(h+1, v-1)-(\alpha r6-\beta 3 \eta b) \cdot A2(h+1, v-1),$$

$$G(h+1, v)=G'(h+1, v)-(\alpha g1-\gamma 1 \eta g) \cdot A1(h, v-1)-(\alpha g2-\gamma 1 \eta g) \cdot A2(h, v-1)-(\alpha g3-\gamma 2 \eta b) \cdot A1(h+1, v-1)-(\alpha g4-\gamma 2 \eta b) \cdot A2(h+1, v-1)-(\alpha g5-\gamma 3 \eta g) \cdot A1(h+2, v-1)-(\alpha g6-\gamma 3 \eta g) \cdot A2(h+2, v-1) \quad (10)$$

The right side of each expression in (10) is made up with the focus detection signal data obtained from the photoelectric conversion units of the focus detection pixels and the predetermined crosstalk rates, and thus, the image data R(h, v) and G(h+1, v) at the R imaging pixel and the G imaging pixel each surrounded by imaging pixels can be calculated through expression (10).

Assuming that $\delta r1=\alpha r1-\beta 1 \eta b$, that $\delta r2=\alpha r2-\beta 1 \eta b$, that $\delta r3=\alpha r3-\beta 2 \eta g$, that $\delta r4=\alpha r4-\beta 2 \eta g$, that $\delta r5=\alpha r5-\beta 3 \eta b$, that $\delta r6=\alpha r6-\beta 3 \eta b$, that $\delta g1=\alpha g1-\gamma 1 \eta g$, that $\delta g2=\alpha g2-\gamma 1 \eta g$, that $\delta g3=\alpha g3-\gamma 2 \eta b$, that $\delta g4=\alpha g4-\gamma 2 \eta b$, that $\delta g5=\alpha g5-\gamma 3 \eta g$ and that $\delta g6=\alpha g6-\gamma 3 \eta g$ in expression (10), crosstalk correction expressions in (11) below are obtained.

$$R(h, v)=R'(h, v)-\delta r1 \cdot A1(h-1, v-1)-\delta r2 \cdot A2(h-1, v-1)-\delta r3 \cdot A1(h, v-1)-\delta r4 \cdot A2(h, v-1)-\delta r5 \cdot A1(h+1, v-1)-\delta r6 \cdot A2(h+1, v-1),$$

$$G(h+1, v)=G'(h+1, v)-\delta g1 \cdot A1(h, v-1)-\delta g2 \cdot A2(h, v-1)-\delta g3 \cdot A1(h+1, v-1)-\delta g4 \cdot A2(h+1, v-1)-\delta g5 \cdot A1(h+2, v-1)-\delta g6 \cdot A2(h+2, v-1) \quad (11)$$

The coefficients $\delta ri$ and $\delta gi$ (i=1~6) in (11) may be calculated and stored in the body drive control device 214 in advance.

Through the operation described above, the image data at the R imaging pixel and the G imaging pixel adjacent to focus detection pixels can be corrected to those in a hypothetical state in which the pixels are not adjacent to the focus detection pixels but instead are adjacent to imaging pixels.

Since the extent of crosstalk is also dependent upon the angle of incidence of the light beam entering a focus detection pixel or an imaging pixel, as detailed later, the crosstalk rate is defined as a function of the position of the correction target imaging pixel (the distance from the image plane center). Crosstalk correction processing is executed by executing the operation expressed in (11) on each imaging pixel adjacent to a focus detection pixel.

Figure 16:
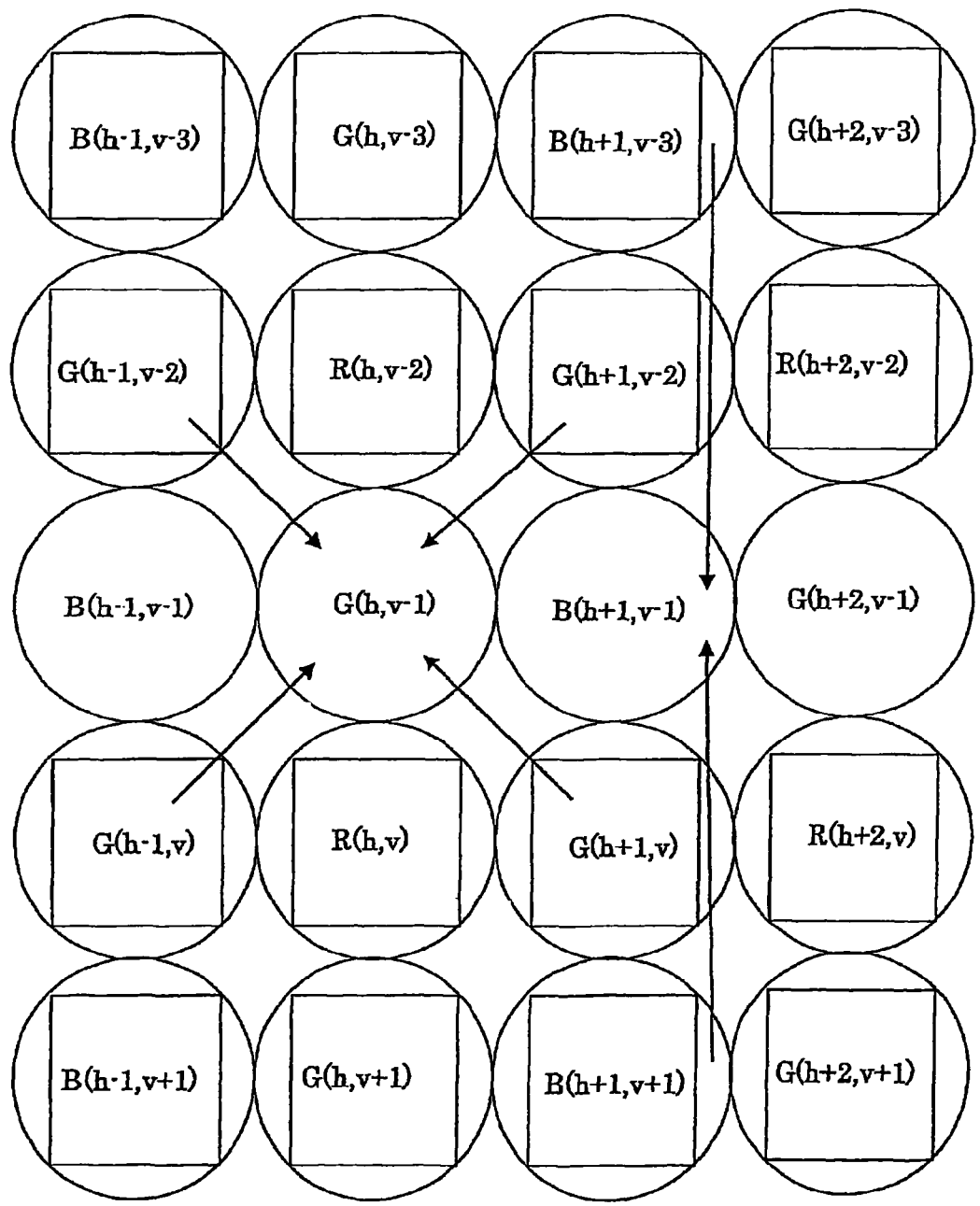
FIG. 16 illustrates how image data at positions occupied by focus detection pixels may be generated through interpolation by using the image data at imaging pixels present around the focus detection pixels.

Next, the pixel interpolation processing executed in step 190 in FIG. 12 is described. FIG. 16 illustrates interpolation executed to obtain image data at positions occupied by focus detection pixels based upon the image data at imaging pixels present around the focus detection pixels in a pixel array corresponding to that shown in FIG. 14. The variables h and v indicate the position of a given pixel along the horizontal direction and the vertical direction in the two-dimensional pixel array shown in FIG. 3.

In reference to FIG. 16, interpolation executed based upon the image data at neighboring imaging pixels to generate pixel data G(h, v−1) at the hth column, v−1th row position occupied by a focus detection pixel and pixel data B(h+1, v−1) at the h+1th column/v−1th row occupied by a focus detection pixel is considered. It is assumed that the image data at the imaging pixels around the focus detection pixels have already undergone the crosstalk correction processing. The hth column/v−1th row pixel position would normally be occupied by a G imaging pixel and accordingly, the image data at this pixel position can be obtained through interpolation, as expressed in (12) below by averaging the image data at four G imaging pixels present around the pixel position.

$$G(h, v-1) = (G(h-1, v-2) + G(h+1, v-2) + G(h-1, v) + G(h+1, v))/4 \quad (12)$$

The h+1th column/v−1th row pixel position would normally be occupied by a B imaging pixel and accordingly, the image data at this pixel position can be obtained through interpolation, as expressed in (13) below, by averaging the image data at two B imaging pixels present around the pixel position.

$$B(h+1, v-1) = (B(h+1, v-3) + G(h+1, v+1))/2 \quad (13)$$

By executing the operation expressed in (12) or (13) in correspondence to each position occupied by a focus detection pixel, the pixel interpolation processing is executed.

In the example described above, no special crosstalk correction processing is executed for the image data at an imaging pixel adjacent to imaging pixels alone. However, since the crosstalk correction processing is executed for each imaging pixel adjacent to a focus detection pixel so as to correct the image data thereat into the hypothetical state in which an imaging pixel instead of the focus detection pixel is adjacent to the target imaging pixel and, as a result, a higher level of uniformity is assured with regard to the extent of crosstalk, thereby achieving an improvement in the image quality. In addition, since the correction processing is executed only for imaging pixels adjacent to focus detection pixels, the image quality can be improved while minimizing the processing load.

It is to be noted that the crosstalk correction processing may also be executed for imaging pixels adjacent only to other imaging pixels. In such a case, the crosstalk correction processing is executed without exception for all pixels in step S180 by hypothetically assuming that they are all imaging pixels. Namely, on the hypothesis that pixels set next to each pixel are all imaging pixels, the crosstalk correction processing is executed uniformly based upon the corresponding crosstalk rates. Next, crosstalk correction processing is executed for each imaging pixel adjacent to a focus detection pixel through the method described earlier. Namely, the difference between the extent of crosstalk occurring at the imaging pixel adjacent to a focus detection pixel and at the imaging pixel adjacent to another imaging pixel is corrected. Through these measures, the crosstalk correction processing can be executed with an even higher level of accuracy based upon a simple algorithm.

In addition, in the example described above, the image data at each imaging pixel adjacent to a focus detection pixel are corrected by using the image data at adjacent focus detection pixels. However, the image data may instead be corrected based upon the image data at other imaging pixels present nearby. For instance, the image data at an imaging pixel affected by crosstalk from focus detection pixels may be replaced with the image data at a same-color imaging pixel present nearby or with data obtained through arithmetic operation executed based upon image data at a different-color imaging pixel present nearby or image data at both a different-color imaging pixel and a same-color imaging pixel present nearby.

Variations of the Embodiment

The photoelectric conversion units at the focus detection pixels may assume an areal size different from that shown in FIG. 14. For instance, focus detection pixels equipped with photoelectric conversion units with a relatively large area, such as those shown in FIG. 14, may be disposed in the focus detection area 101 at the image plane center in FIG. 2, where the range-finding pupils are not readily vignetted via the aperture at the photographic optical system. However, focus detection pixels equipped with photoelectric conversion units having a smaller area than those at the focus detection pixels in FIG. 14 may be disposed in the focus detection areas 102 and 103 away from the center of the image plane where the range-finding pupils tend to be vignetted readily.

Figure 17:
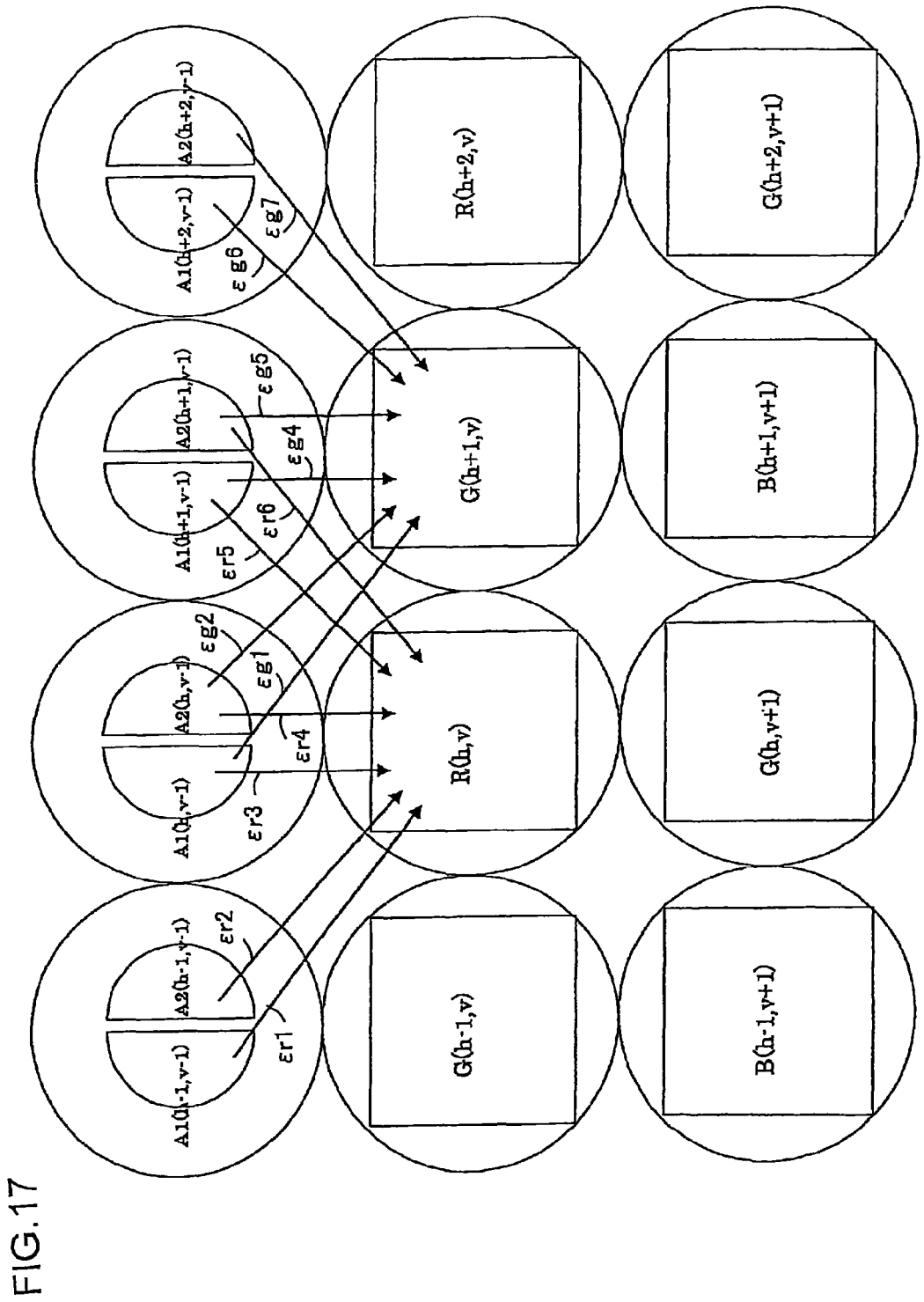
FIG. 17 illustrates how crosstalk occurring at imaging pixels present around focus detection pixels equipped with photoelectric conversion units having a small area, may be corrected.

FIG. 17 illustrates crosstalk correction that may be executed for imaging pixels present near focus detection pixels equipped with photoelectric conversion units having a smaller area. Correction of the image data R'(h, v) at the R imaging pixel present in the hth column/vth row position adjacent to a focus detection pixel and the image data G'(h+1, v) at the G imaging pixel present at the h+1th column/vth row position, executed based upon the focus detection signal data at the focus detection pixels present near them, as explained earlier in reference to FIG. 14, is now contemplated. The extent of crosstalk changes in correspondence to the areal size of the photoelectric conversion units at the focus detection pixels and, for this reason, crosstalk rates different from the crosstalk rates in FIG. 14 must be used.

In FIG. 17, the crosstalk rate of the crosstalk from a focus detection pixel to the R imaging pixel is indicated as $\epsilon ri$ (i=1~6), whereas the crosstalk rate of the crosstalk from a focus detection pixel to the G imaging pixel is indicated as $\epsilon gi$ (i=1~6). The image data R(h, v) at the R imaging pixel and the image data G(h+1, v) at the G imaging pixel each surrounded by imaging pixels only can be calculated as expressed in (14), through a process similar to that with which expression (10) is obtained.

$$R(h, v) = R'(h, v) - (\epsilon r1 - \beta1 \cdot \zeta b) \cdot A1(h-1, v-1) - (\epsilon r2 - \beta1 \cdot \zeta b) \cdot A2(h-1, v-1) - (\epsilon r3 - \beta2 \cdot \zeta g) \cdot A1(h, v-1) - (\epsilon r4 - \beta2 \cdot \zeta g) \cdot A2(h, v-1) - (\epsilon r5 - \beta3 \cdot \zeta b) \cdot A1(h+1, v-1) - (\epsilon r6 - \beta3 \cdot \zeta b) \cdot A2(h+1, v-1),$$

$$G(h+1, v) = G'(h+1, v) - (\epsilon g1 - \gamma1 \cdot \zeta g) \cdot A1(h, v-1) - (\epsilon g2 - \gamma1 \cdot \zeta g) \cdot A2(h, v-1) - (\epsilon g3 - \gamma2 \cdot \zeta b) \cdot A1(h+1, v-1) - (\epsilon g4 - \gamma2 \cdot \zeta b) \cdot A2(h+1, v-1) - (\epsilon g5 - \gamma3 \cdot \zeta g) \cdot A1(h+2, v-1) - (\epsilon g6 - \gamma3 \cdot \zeta g) \cdot A2(h+2, v-1) \quad (14)$$

$\zeta b$ and $\zeta g$ in expression (14) represent conversion coefficients used to convert in approximation the focus detection signal data at the focus detection pixels with photoelectric conversion units having a smaller areal size to the image data at B imaging pixels and G imaging pixels and these conversion coefficients should be determined in advance through theoretical reasoning or testing and stored into the body drive control device 214.

Figure 18:
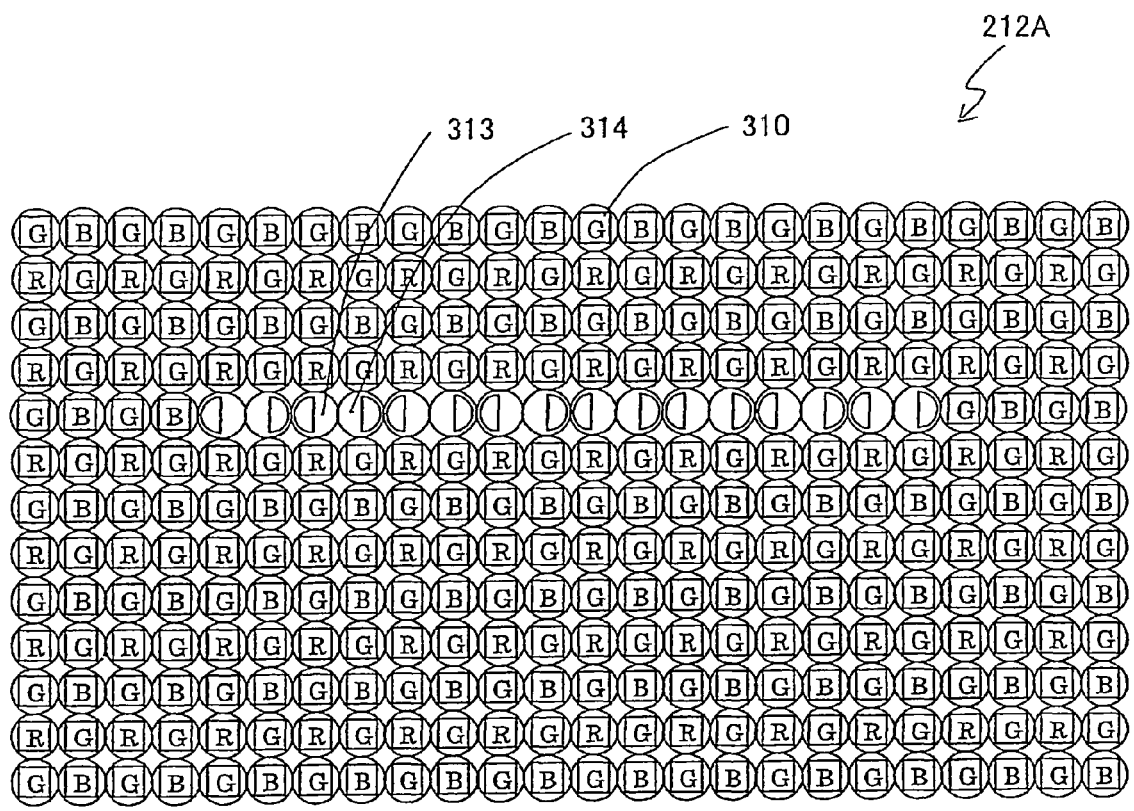
FIG. 18 shows an image sensor that includes focus detection pixels each equipped with a single photoelectric conversion unit.

While each focus detection pixel 311 in the image sensor 212 shown in FIG. 3 includes a pair of photoelectric conversion units, a single photoelectric conversion unit may be disposed in each of focus detection pixels 313 and 314, as in an image sensor 212A shown in FIG. 18. In the image sensor in FIG. 18, a focus detection pixel 313 and the focus detection pixel 314 disposed next to the focus detection pixel 313 make up a pair and the pair of focus detection pixels 313 and 314 is equivalent to a single focus detection pixel 311 in FIG. 3. The imaging pixels 310 are each constituted with a micro lens 10 and a photoelectric conversion unit 11, as are those in FIG. 4.

As shown in FIG. 19A, each focus detection pixel 313 is constituted with a micro-lens 10 and a photoelectric conversion unit 16. As shown in FIG. 19B, the focus detection pixels 314 are each constituted with a micro-lens 10 and a photoelectric conversion unit 17. The photoelectric conversion units 16 and 17 are projected onto the exit pupil of the interchangeable lens 202 via the micro-lenses 10 to define the range-finding pupils 92 and 93 in FIG. 10. As a result, pairs of image outputs to be used for focus detection can be obtained from the array of focus detection pixels 313 and 314. With a single photoelectric conversion unit disposed in each focus detection pixel, it is ensured that the structure of the image sensor read circuit does not become complicated.

Figure 20:
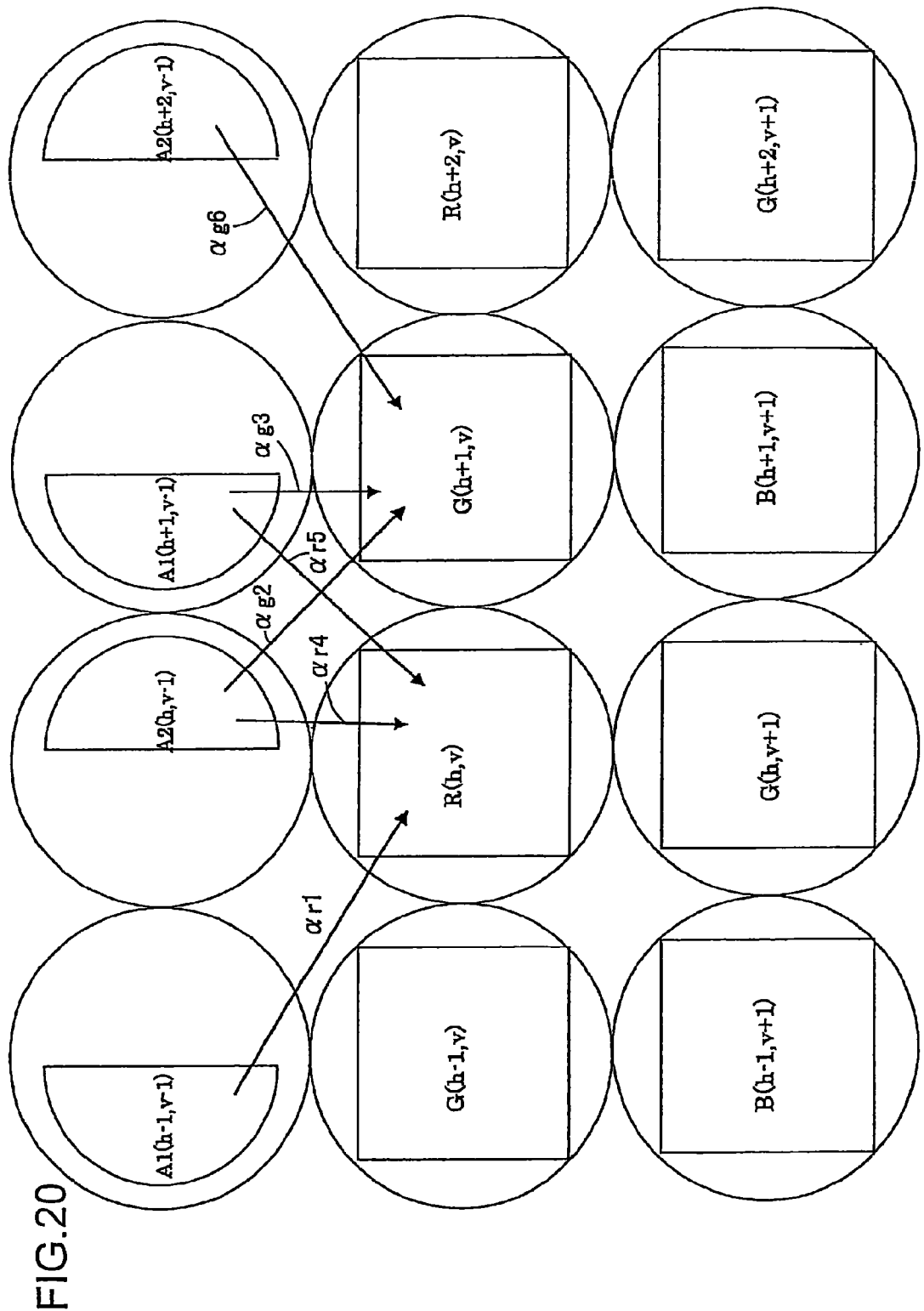
FIG. 20 illustrates how crosstalk in the output data from imaging pixels adjacent to the focus detection pixels in FIGS. 19A and 19B achieved in the variation may be corrected.

FIG. 20 illustrates crosstalk correction that may be executed to correct the output data from imaging pixels adjacent to focus detection pixels assuming the structures illustrated in FIGS. 19A and 19B. Correction of the image data R'(h, v) at the R imaging pixel present in the hth column/vth row position adjacent to a focus detection pixel and the image data G'(h+1, v) at the G. imaging pixel present at the h+1th column/vth row position adjacent to a focus detection pixel, executed based upon the output data from the adjacent focus detection pixels as explained earlier in reference to FIG. 14, is now contemplated. In FIG. 20, the crosstalk rate of the crosstalk from a focus detection pixel to the R imaging pixel is indicated as $\alpha ri$ (i=1, 4, 5), whereas the crosstalk rate of the crosstalk from a focus detection pixel to the G imaging pixel is indicated as $\alpha gi$ (i=2, 3, 6).

The output data R(h, v) at the R imaging pixel and the image data G(h+1, v) at the G imaging pixel each surrounded by imaging pixels can be calculated as expressed in (15), through a process similar to that with which expression (10) is obtained.

$$R(h, v)=R'(h, v)-(\alpha r1-\beta 1\cdot \theta b)\cdot A1(h-1, v-1)-(\alpha r4-\beta 2\cdot \theta g)\cdot A2(h, v-1)-(\alpha r5-\beta 3\cdot \theta b)\cdot A1(h+1, v-1),$$

$$G(h+1, v)=G'(h+1, v)-(\alpha g2-\gamma 1\cdot \theta g)\cdot A2(h, v-1)-(\alpha g3-\gamma 2\cdot \theta b)\cdot A1(h+1, v-1)-(\alpha g6-\gamma 3\cdot \theta g)\cdot A2(h+2, v-1) \quad (15)$$

$\theta b$ and $\theta g$ in expression (15) represent conversion coefficients used to convert in approximation the focus detection signal data output from the focus detection pixels each equipped with a single photoelectric conversion unit to the image data at B imaging pixels and G imaging pixels and these conversion coefficients should be determined in advance through theoretical reasoning or testing and stored into the body drive control device 214.

Figure 21:
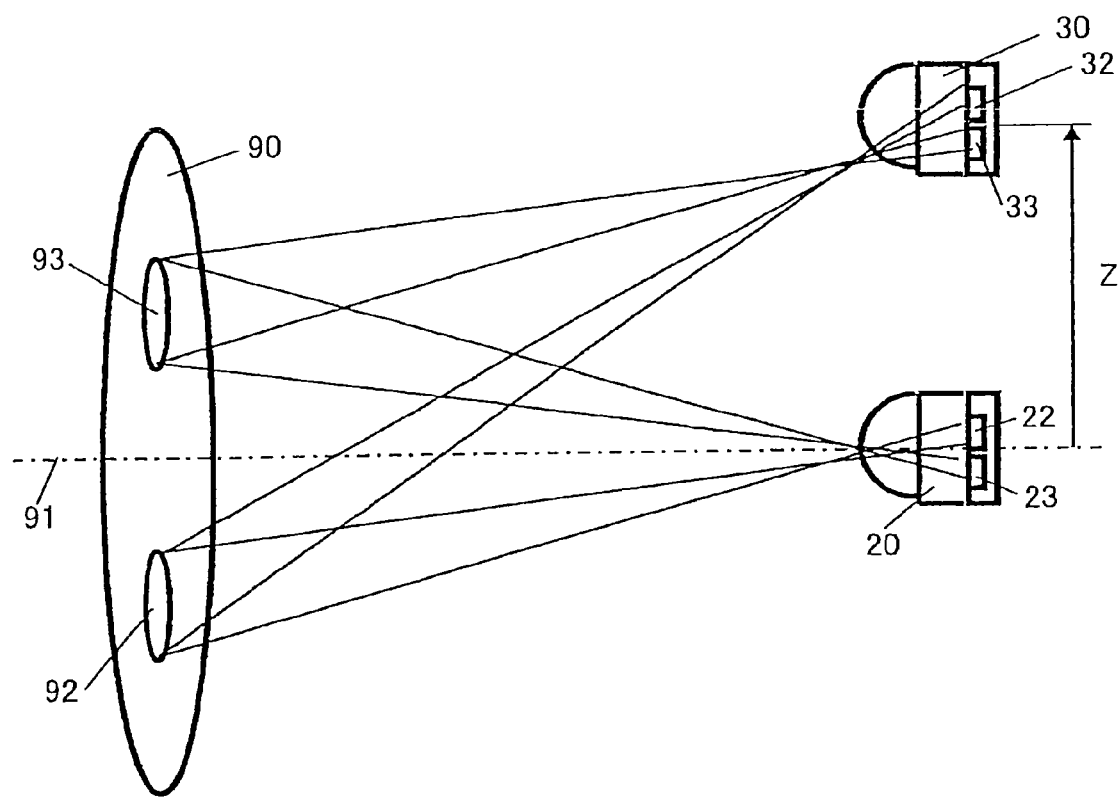
FIG. 21 illustrates how crosstalk manifests in varying extents depending upon the positions of the imaging pixels and the focus detection pixels on the image plane.

FIG. 21 illustrates how crosstalk manifests to varying extents in correspondence to specific positions occupied by imaging pixels and focus detection pixels on the image plane (the figure shows focus detection pixels at different positions as an example). The figure shows a focus detection pixel 20 equipped with a pair of photoelectric conversion units 22 and 23, set on the optical axis 91 of the photographic lens, and a focus detection pixel 30 equipped with a pair of photoelectric conversion units 32 and 33, set at a position away from the optical axis 91 by a distance Z. The angle of incidence of the light beam entering the focus detection pixel 30 (the angle formed relative to the optical axis) is greater than the angle of incidence of the light beam entering the focus detection pixel 20, and thus, the extent of crosstalk from the focus detection pixel 30 to a nearby imaging pixel is greater.

When the extent of crosstalk is affected by the focus detection pixel position or the imaging pixel position as in this case, crosstalk rates should be measured in correspondence to varying distances from the optical axis and stored in advance. The crosstalk correction should be executed by using the crosstalk rate corresponding to the position of the focus detection pixel or the imaging pixel (the distance from the optical axis) having output that data to be used in the crosstalk correction.

In addition, light beams entering a focus detection pixel from an area other than the range-finding pupils may also cause crosstalk as explained earlier. Such a light beam is defined by the size of the exit pupil of the photographic optical system and the distance from the exit pupil (the distance between the focus detection pixel on the optical axis and the exit pupil), and the crosstalk rate corresponding to the focus detection pixels 30 away from the optical axis changes in correspondence to the size of the exit pupil and the distance to the exit pupil. The crosstalk correction may be executed under such circumstances by measuring crosstalk rates to be used in the crosstalk correction in correspondence to varying sizes of exit pupil of the photographic optical system and varying distances to the exit pupil, storing the measured values as data corresponding to the specific exit pupil sizes and exit pupil distances, receiving from the lens drive control device the exit pupil size data and the exit pupil distance data for the photographic optical system used in the imaging operation and executing crosstalk correction on the image data at the target imaging pixel based upon the crosstalk rate corresponding to the exit pupil size data and the exit pupil distance data.

While the crosstalk correction is executed to correct data affected by the crosstalk from three focus detection pixels present next to the target imaging pixels in the crosstalk correction operations expressed in (10), (11), (14) and (15), crosstalk correction may instead be executed to correct the crosstalk from a single focus detection pixel closest to the target imaging pixel or to correct data affected by the crosstalk from three or more focus detection pixels present near the target imaging pixel. For instance, R'(h, v) in FIG. 14 may be corrected by using A1 (h+2, v−1), A2 (h+2, v−1) and the like.

While the crosstalk correction is executed to correct the image data at the target imaging pixel adjacent to a focus detection pixel in the crosstalk correction operations expressed in (10), (11), (14) and (15), crosstalk correction may instead be executed as described above on image data at an imaging pixel present near a focus detection pixel instead of being present directly adjacent to a focus detection pixel, which is still bound to be affected by crosstalk from the focus detection pixel.

Figure 22:
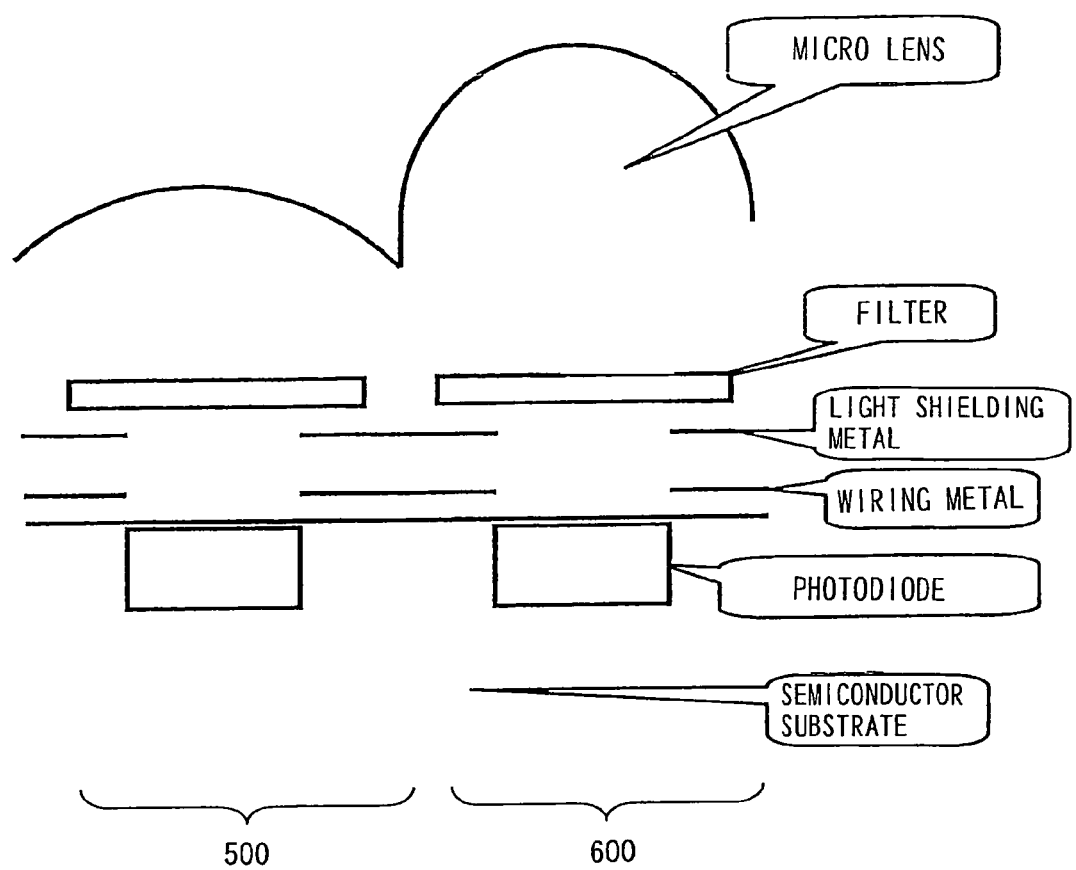
FIG. 22 is a sectional view of an imaging pixel and a focus detection pixel disposed next to each other.

FIG. 22 is a sectional view of an imaging pixel 500 and a focus detection pixel 600 adjacent to each other. The imaging pixel 500 and focus detection pixel 600 may differ from each other in the following characteristics thereof.
(1) Optical characteristics such as the micro lens curvature, focal length and size
(2) Wavelength characteristics such as the spectral sensitivity of the filter (3.) Structural characteristics such as the layout with which the light shielding metal and the wiring metal are disposed, the distance between the light shielding metal and the wiring metal and the thicknesses of the light shielding metal and the wiring metal (4) The structure of the photodiode Due to these differences, the crosstalk from a focus detection pixel affects nearby imaging pixels differently from the manner in which the crosstalk from a regular imaging pixel affects other imaging pixels nearby. The present invention may be adopted in all types of crosstalk correction executed to correct the difference in the extent of crosstalk attributable to the structural differences between focus detection pixels and imaging pixels described above.

It is to be noted that, while the imaging pixels in the image sensor 212 shown in FIG. 3 are equipped with color filters assuming a Bayer array, color filters adopting a structure and an array other than those at the image sensor 212 may be used in conjunction with the present invention. For instance, an image sensor that includes complementary color filters, i.e., G (green) filters, Ye (yellow) filters, Mg (magenta) filters and Cy (cyan) filters, may be used.

While the focus detection pixels in the image sensor 212 shown in FIG. 3 are not equipped with color filters, the present invention may be adopted in conjunction with focus detection pixels equipped with color filters, the color of which matches one of the colors of the color filters at the imaging pixels (e.g., green filters).

While the focus detection pixels shown in FIGS. 5, 19A and 19B each include (a) photoelectric conversion unit(s) assuming a semicircular shape, the photoelectric conversion units may assume a shape other than this. For instance, the photoelectric conversion units in the focus detection pixels may assume an elliptical shape, a rectangular shape, a polygonal shape or the like. If focus detection pixel rows at the image sensor include focus detection pixels equipped with photoelectric conversion units assuming different shapes, crosstalk rates corresponding to the different photoelectric conversion unit shapes should be measured and stored, and crosstalk correction should be executed by selecting a specific crosstalk rate in correspondence to the shape of the photoelectric conversion unit (s) at the focus detection pixel for which the crosstalk correction is being executed.

While the image sensor 212 in FIG. 3 assumes a dense square grid array of imaging pixels and focus detection pixels, the image sensor may instead assume a dense hexagonal grid array.

The present invention may be adopted in conjunction with either a CCD image sensor or a CMOS image sensor.

The imaging apparatus according to the present invention may be embodied as an apparatus other than a digital still camera or a film still camera with an interchangeable lens detachably mounted at the camera body. For instance, the present invention may be adopted in a digital still camera or a film still camera with an integrated lens. It may also be adopted in a video camera, a compact camera module built into a portable telephone or the like, a surveillance camera or the like as well. The present invention may be further adopted in a focus detection device installed in a device other than a camera, a range-finding device or a stereo range-finding device.

The above described embodiments are examples and various modifications can be made without departing from the scope of the invention.

What is claimed is:

1. An imaging apparatus, comprising:
   an image sensor with imaging pixels and focus detection pixels arrayed on a plane, which captures an image via an optical system; and
   a correction unit that corrects image data output from an imaging pixel based upon output data from a focus detection pixel near the imaging pixel.

2. An imaging apparatus according to claim 1, wherein:
   the focus detection pixel is structurally different from the imaging pixel.

3. An imaging apparatus according to claim 2, wherein:
   a photoelectric conversion element at the focus detection pixel has an areal size different from a photoelectric conversion element at the imaging pixel.

4. An imaging apparatus according to claim 2, wherein:
   a photoelectric conversion element at the focus detection pixel has a shape different from a photoelectric conversion element at the imaging pixel.

5. An imaging apparatus according to claim 2, wherein:
   a photoelectric conversion element at the focus detection pixel has a position different from a photoelectric conversion element at the imaging pixel.

6. An imaging apparatus according to claim 2, wherein:
   the imaging pixel and the focus detection pixel each include a light condenser; and
   the light condenser at the focus detection pixel is structurally different from the light condenser at the imaging pixel.

7. An imaging apparatus according to claim 1, wherein:
   the focus detection pixel has spectral sensitivity characteristics different from spectral sensitivity characteristics of the imaging pixel.

8. An imaging apparatus according to claim 1, wherein:
   the correction unit adjusts a correction amount based upon an areal size of a photoelectric conversion element at the focus detection pixel.

9. An imaging apparatus according to claim 1, wherein:
   the correction unit adjusts a correction amount based upon an aperture opening F number of the optical system.

10. An imaging apparatus according to claim 1, wherein:
    the correction unit adjusts a correction amount based upon a position of the imaging pixel on an imaging plane formed via the optical system.

11. An imaging apparatus according to claim 1, wherein:
    the correction unit adjusts a correction amount based upon a distance between a photoelectric conversion element at the focus detection pixel and a photoelectric conversion element at the imaging pixel.

12. An imaging apparatus according to claim 1, wherein:
    the imaging pixels include a plurality of types of imaging pixels with varying spectral sensitivity characteristics; and
    the correction unit adjusts a correction amount based upon the spectral sensitivity characteristics of the imaging pixels.

13. An imaging apparatus according to claim 1, further comprising:
    an interpolation unit that generates image data at a position occupied by the focus detection pixel through interpolation executed based upon image data at imaging pixels having been corrected by the correction unit.

14. An imaging apparatus according to claim 1, wherein:
    the focus detection pixels include at least one photoelectric conversion element, the at least one photoelectric conversion element generates a pair of image signals corresponding to a pair of images formed with a pair of light fluxes passing through the optical system; and the imaging apparatus further comprises a focus detection unit that detects a focusing condition of the optical system by determining a shift quantity, indicating an extent of relative offset between the pair of images, based upon the pair of image signals.

15. An imaging apparatus according to claim 14, wherein: the focus detection pixel includes one micro lens and a pair of photoelectric conversion elements.

16. An imaging apparatus according to claim 14, wherein: the focus detection pixels include first focus detection pixels each equipped with one micro lens and a photoelectric conversion element that receives one of the light fluxes making up the pair of light fluxes and second focus detection pixels each equipped with one micro lens and a photoelectric conversion element that receives another light flux making up the pair of light fluxes.

17. An imaging apparatus according to claim 1, wherein: the correction unit corrects the image data output from the imaging pixel based upon the output data from the focus detection pixel near the imaging pixel and a difference of crosstalk effect between:

the imaging pixel when the imaging pixel is near another imaging pixel and the imaging pixel when the imaging pixel is near a focus detection pixel.

18. An imaging apparatus according to claim 1, wherein: the correction unit corrects crosstalk for image data output from an imaging pixel by assuming that all pixels are imaging pixels, and then corrects the corrected image data of an imaging pixel near a focus detection pixel, based upon data output from the focus detection pixel near the imaging pixel and a difference of crosstalk effect between:

the imaging pixel when the imaging pixel is near another imaging pixel and the imaging pixel when the imaging pixel is near a focus detection pixel.

19. An imaging apparatus according to claim 17, wherein: the correction unit determines a correction value by multiplying the output data from the focus detection pixel near the imaging pixel by a coefficient obtained based upon a difference of crosstalk effect between:

the imaging pixel when the imaging pixel is near another imaging pixel and the imaging pixel when the imaging pixel is near a focus detection pixel and corrects the image data based upon the correction value.

20. An imaging apparatus, comprising:

an image sensor with imaging pixels and focus detection pixels arrayed on a plane, which captures an image via an optical system;

a correction unit that corrects image data output from an imaging pixel based upon output data from a pixel near the imaging pixel; and an interpolation unit that generates image data at positions occupied by the focus detection pixels through interpolation executed based upon image data at the imaging pixels corrected by the correction unit.

21. A method of correcting image data, comprising:

acquiring data from an imaging pixel and output data from a focus detection pixel near the imaging pixel; and correcting image data output from the imaging pixel based upon output data from the focus detection pixel near the imaging pixel, wherein imaging pixels and focus detection pixels are included in an array on a plane of an image sensor that captures an image via an optical system.

22. A method of correcting image data according to claim 21, further comprising:

providing a first light condenser for the imaging pixel and a second light condenser for the focus detection pixel;

wherein the second light condenser at the focus detection pixel is structurally different from the first light condenser at the imaging pixel.

23. A method of correcting image data according to claim 21, wherein the focus detection pixel has spectral sensitivity characteristics different from spectral sensitivity characteristics of the imaging pixel.

24. A method of correcting image data according to claim 21, wherein the step of correcting image data comprises adjusting a correction amount based upon an areal size of a photoelectric conversion element at the focus detection pixel.

25. A method of correcting image data according to claim 21, wherein the step of correcting image data comprises adjusting a correction amount based upon an aperture opening F number of the optical system.

26. A method of correcting image data according to claim 21, wherein the step of correcting image data comprises adjusting a correction amount based upon a position of the imaging pixel on an imaging plane formed via the optical system.

27. A method of correcting image data according to claim 21, wherein the step of correcting image data comprises adjusting a correction amount based upon a distance between a photoelectric conversion element at the focus detection pixel and a photoelectric conversion element at the imaging pixel.

28. A method of correcting image data according to claim 21, wherein the imaging pixels include a plurality of types of imaging pixels with varying spectral sensitivity characteristics, and the step of correcting image data comprises adjusting a correction amount based upon the spectral sensitivity characteristics of the imaging pixels.

29. A method of correcting image data according to claim 21, further comprising:

generating image data at a position occupied by the focus detection pixel through interpolation executed based upon image data at imaging pixels having been corrected by the step of correcting image data.

30. A method of correcting image data according to claim 21, wherein the focus detection pixels include at least one photoelectric conversion element, the at least one photoelectric conversion element generates a pair of image signals corresponding to a pair of images formed with a pair of light fluxes passing through the optical system, and the method further comprises detecting a focusing condition of the optical system by determining a shift quantity, indicating an extent of relative offset between the pair of images, based upon the pair of image signals.

31. A method of correcting image data according to claim 30, wherein the focus detection pixels each include at least one micro lens and a pair of photoelectric conversion elements.

32. A method of correcting image data according to claim 30, wherein
the focus detection pixels include first focus detection pixels each including one micro lens and a photoelectric conversion element that receives one of the light fluxes making up the pair of light fluxes, and second focus detection pixels each including one micro lens and a photoelectric conversion element that receives another light flux making up the pair of light fluxes.

33. A method of correcting image data according to claim 21, wherein
the step of correcting image data corrects the image data based upon the output data output from the focus detection pixel and a difference of crosstalk effect between:
the imaging pixel when the imaging pixel is near another imaging pixel and
the imaging pixel when the imaging pixel is near a focus detection pixel.

34. A method of correcting image data according to claim 21, wherein the step of correcting image data further comprises:
correcting crosstalk for image data output from an imaging pixel by assuming that all pixels are imaging pixels; and
correcting the image data of an imaging pixel near a focus detection pixel, based upon the output data output from the focus detection pixel and a difference of crosstalk effect between:
the imaging pixel when the imaging pixel is near another imaging pixel, and
the imaging pixel when the imaging pixel is near a focus detection pixel.

35. A method of correcting image data according to claim 21, wherein the step of correcting image data comprises:
obtaining a coefficient based upon a difference of crosstalk effect between:
the imaging pixel when the imaging pixel is near another imaging pixel and
the imaging pixel when the imaging pixel is near a focus detection pixel;
determining a correction value by multiplying the output data from the focus detection pixel near the imaging pixel by a coefficient; and
correcting the image data based upon the correction value.

36. A method of correcting image data, comprising:
acquiring image data from an imaging pixel and output data from a focus detection pixel near the imaging pixel;
correcting image data output from the imaging pixel based upon output data from a pixel near the imaging pixel; and
generating image data at positions occupied by focus detection pixels through interpolation executed based upon image data at imaging pixels corrected by the step of correcting image data, wherein
imaging pixels and focus detection pixels are included in an array on a plane of an image sensor that captures an image via an optical system.

* * * * *